(12) United States Patent
Kimura et al.

(10) Patent No.: US 6,411,580 B1
(45) Date of Patent: Jun. 25, 2002

(54) STORING DATA ON A MEDIUM IN AN OPTICAL SYSTEM

(76) Inventors: Noboru Kimura, 3014 Windmill Rd., Torrance, CA (US) 90505; Ronald G. Vitullo, 2045 Canyon Lake Dr., San Ramon, CA (US) 94583-4922; Yasuhiro Yamazaki, 17 Mustang RJ, Rancho Palos Verdes, CA (US) 90275

( * ) Notice: Subject to any disclaimer, the term of this patent is extended or adjusted under 35 U.S.C. 154(b) by 0 days.

(21) Appl. No.: 09/682,748

(22) Filed: Oct. 12, 2001

Related U.S. Application Data

(62) Division of application No. 09/921,805, filed on Aug. 3, 2001, which is a continuation of application No. 09/228,245, filed on Jan. 11, 1999, now Pat. No. 6,343,061, which is a division of application No. 08/475,241, filed on Jun. 7, 1995, now Pat. No. 5,859,825, which is a division of application No. 07/964,518, filed on Jan. 25, 1993, now Pat. No. 5,537,379.

(51) Int. Cl.$^7$ .................................................. G11B 7/00
(52) U.S. Cl. ........................... 369/59.17; 369/59.12; 369/59.24
(58) Field of Search ........................ 369/13.17, 275.3, 369/53.41, 275.2, 275.4, 47.1, 53.1, 59.1, 59.12, 59.14, 59.24, 116, 47.19, 53.22, 59.17, 59.21, 124.15, 59.16, 126, 44.25, 59.11, 59.19

(56) References Cited

U.S. PATENT DOCUMENTS

| | | |
|---|---|---|
| 3,518,442 A | 6/1970 | Johnson |
| 3,530,258 A | 9/1970 | Gregg et al. |
| 4,190,860 A | 2/1980 | Somers et al. |
| 4,210,931 A | 7/1980 | Bailey et al. |
| 4,222,072 A | 9/1980 | Bailey et al. |
| 4,225,873 A | 9/1980 | Winslow |
| 4,232,201 A | 11/1980 | Canino |
| 4,232,337 A | 11/1980 | Winslow et al. |
| 4,282,598 A | 8/1981 | Elliott |
| 4,358,796 A | 11/1982 | Ceshkovsky et al. |
| 4,370,679 A | 1/1983 | Ceshkovsky et al. |
| 4,371,899 A | 2/1983 | Ceshkovsky et al. |
| 4,375,091 A | 2/1983 | Dakin et al. |
| 4,406,000 A | 9/1983 | Shoji et al. |
| 4,414,655 A | 11/1983 | Shoji et al. |

(List continued on next page.)

FOREIGN PATENT DOCUMENTS

| | | |
|---|---|---|
| CA | 833100 | 1/1970 |
| EP | 64196 | 11/1982 |
| EP | 265849 | 10/1987 |
| EP | 289260 | 11/1988 |
| EP | 320975 | 6/1989 |
| EP | 364586 | 4/1990 |
| EP | 388271 | 9/1990 |
| EP | 397404 | 11/1990 |
| EP | 405610 | 1/1991 |
| EP | 418100 | 3/1991 |
| EP | 450622 | 10/1991 |
| GB | 2098379 | 11/1982 |
| JP | 63-152058 | 6/1988 |
| JP | 63304452 | 12/1988 |
| JP | 255849 | 11/1990 |
| JP | 338657 | 6/1991 |
| WO | 9221125 | 11/1992 |

*Primary Examiner*—Ali Neyzari
(74) *Attorney, Agent, or Firm*—Keiji Masaki; Steve A. Wong; Caroline T. Do

(57) ABSTRACT

An encoder converts a binary data word to a binary code word. The encoded bits have first and second binary values at a predetermined clock interval. A pulse generator responds to the encoded bits to generate energizing pulses during each clock interval in which the encoded bits have the first binary value. The energizing pules have a uniform duration less than the clock interval. A laser responds to the energizing pulses for recording on a medium.

57 Claims, 18 Drawing Sheets

U.S. PATENT DOCUMENTS

| | | | |
|---|---|---|---|
| 4,439,848 A | 3/1984 | Ceshkovsky et al. | |
| 4,451,913 A | 5/1984 | Elliott | |
| 4,456,914 A | 6/1984 | Winslow | |
| 4,466,023 A | 8/1984 | Busby | |
| 4,467,467 A | 8/1984 | Wilkinson et al. | |
| 4,488,279 A | 12/1984 | Wilkinson et al. | |
| 4,499,569 A | 2/1985 | De Romana | |
| 4,536,863 A | 8/1985 | Giddings | |
| RE32,051 E | 12/1985 | Ceshkovsky et al. | |
| 4,571,716 A | 2/1986 | Szerlip | |
| 4,583,210 A | 4/1986 | Winslow | |
| 4,611,318 A | 9/1986 | Winslow | |
| 4,626,826 A | 12/1986 | Fukuda et al. | |
| 4,638,377 A | 1/1987 | Dakin | |
| RE32,431 E | 6/1987 | Dakin et al. | |
| 4,677,421 A | 6/1987 | Taniyama | |
| 4,701,898 A | 10/1987 | Giddings | |
| 4,703,368 A | 10/1987 | Dakin | |
| 4,703,467 A | 10/1987 | Elliott | |
| 4,706,133 A | 11/1987 | Giddings | |
| RE32,574 E | 1/1988 | Ceshkovsky et al. | |
| 4,727,433 A | 2/1988 | Dakin | |
| 4,727,532 A | 2/1988 | Giddings | |
| 4,751,692 A | 6/1988 | Giddings | |
| RE32,709 E | 7/1988 | Ceshkovsky et al. | |
| 4,757,393 A | 7/1988 | Dakin et al. | |
| 4,774,699 A | 9/1988 | Giddings | |
| 4,809,247 A | 2/1989 | Elliott | |
| 4,811,280 A | 3/1989 | Berkowitz et al. | |
| 4,845,697 A | 7/1989 | Giddings | |
| 4,890,275 A | 12/1989 | Mori | |
| 4,907,215 A | 3/1990 | Sako et al. | |
| 4,928,187 A * | 5/1990 | Rees | 360/40 |
| 4,961,182 A | 10/1990 | Saito et al. | |
| 4,975,897 A | 12/1990 | Tanahashi | |
| 4,975,898 A | 12/1990 | Yoshida | |
| 4,998,011 A | 3/1991 | Shuman | |
| 5,003,526 A | 3/1991 | Bailey | |
| 5,084,852 A | 1/1992 | Bailey | |
| 5,099,464 A | 3/1992 | Maeda | |
| 5,101,395 A * | 3/1992 | Cardero et al. | 369/59.17 |
| 5,109,373 A * | 4/1992 | Ohno et al. | 369/100 |
| 5,124,968 A | 6/1992 | Kobayashi | |
| 5,126,994 A | 6/1992 | Ogawa et al. | |
| 5,136,558 A | 8/1992 | Getreuer et al. | |
| 5,155,633 A | 10/1992 | Grove et al. | |
| 5,166,914 A | 11/1992 | Shimada et al. | |
| 5,177,640 A | 1/1993 | Grassens | |
| 5,182,734 A | 1/1993 | Watanabe et al. | |
| 5,189,650 A | 2/1993 | Watanabe et al. | |
| 5,200,935 A | 4/1993 | Watanabe et al. | |
| 5,233,589 A | 8/1993 | Saito et al. | |
| 5,241,524 A | 8/1993 | Lee | |
| 5,245,174 A | 9/1993 | Prikryl et al. | |
| 5,253,244 A | 10/1993 | Bailey | |
| 5,309,424 A | 5/1994 | Ogawa | |
| 5,313,332 A | 5/1994 | Schell et al. | |
| 5,321,680 A | 6/1994 | Bailey | |
| 5,323,374 A | 6/1994 | Arai et al. | |
| 5,327,411 A | 7/1994 | Iwasa et al. | |
| 5,331,622 A | 7/1994 | Ernst et al. | |
| RE34,719 E | 9/1994 | Yamamoto et al. | |
| 5,349,175 A | 9/1994 | Prikryl | |
| 5,349,349 A | 9/1994 | Shimizume | |
| 5,373,490 A | 12/1994 | Bailey | |
| 5,375,116 A | 12/1994 | Bailey | |
| 5,448,545 A | 9/1995 | Bailey | |
| 5,479,390 A | 12/1995 | Bailey | |
| 5,490,127 A | 2/1996 | Ohta et al. | |
| 5,513,167 A | 4/1996 | Udagawa et al. | |
| 5,517,481 A | 5/1996 | Kobayashi | |
| 5,659,535 A * | 8/1997 | Kimura et al. | 369/59.16 |
| 5,682,367 A * | 10/1997 | Kimura et al. | 369/59.17 |
| 5,706,267 A * | 1/1998 | Kimura et al. | 369/124.15 |
| 5,761,170 A * | 6/1998 | Kimura et al. | 369/59.12 |
| 5,774,440 A * | 6/1998 | Kimura et al. | 369/59.11 |
| 5,841,748 A | 11/1998 | Yamamuro | |
| 5,878,015 A * | 3/1999 | Schell et al. | 369/116 |
| 5,894,468 A * | 4/1999 | Kimura et al. | 369/124.05 |

* cited by examiner

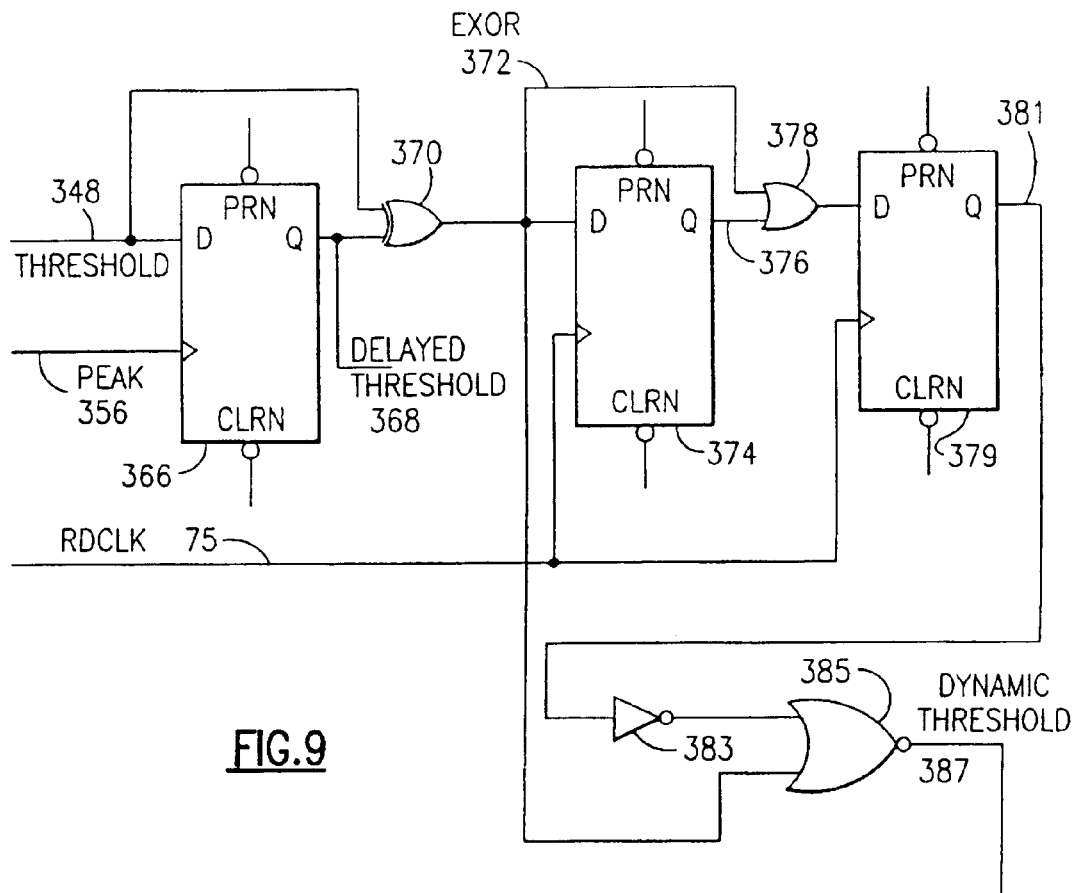
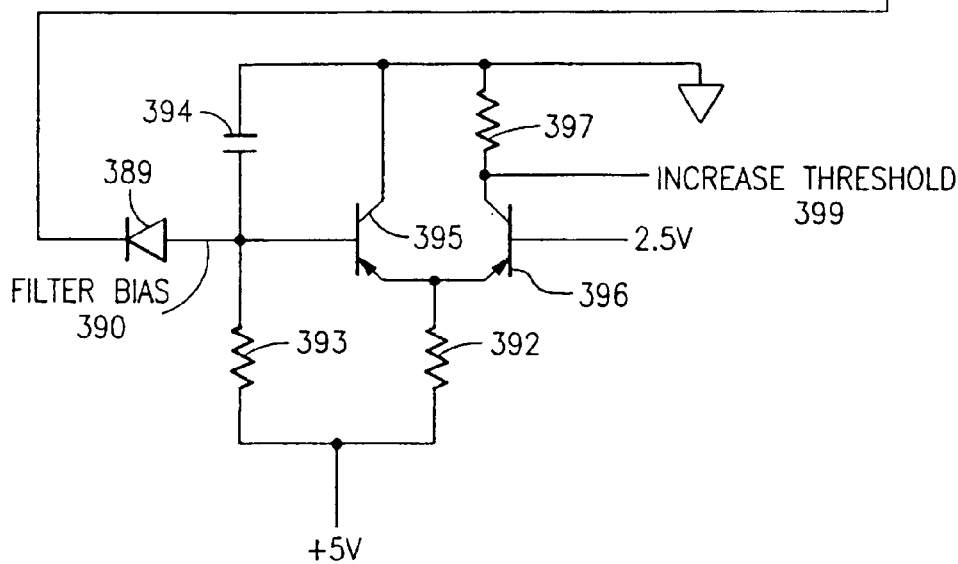
FIG.9

| ZONE | (ABSOLUTE) | NO. OF SECTORS PER TRACK | NO. OF SEC./ZONE | WRITE FREQ. (MHZ) |
|---|---|---|---|---|
| 1 | 0 - 475 | 40 | 19040 | 10.591 |
| 2 | 476 - 951 | 41 | 19516 | 10.852 |
| 3 | 952 - 1427 | 42 | 19992 | 11.117 |
| 4 | 1428 - 1903 | 43 | 20468 | 11.368 |
| 5 | 1904 - 2379 | 44 | 20944 | 11.636 |
| 6 | 2380 - 2855 | 45 | 21420 | 11.963 |
| 7 | 2856 - 3331 | 46 | 21896 | 12.180 |
| 8 | 3332 - 3807 | 47 | 22372 | 12.459 |
| 9 | 3808 - 4283 | 48 | 22848 | 12.705 |
| 10 | 4284 - 4759 | 49 | 23324 | 12.992 |
| 11 | 4760 - 5235 | 50 | 23800 | 13.257 |
| 12 | 5236 - 5711 | 51 | 24276 | 13.533 |
| 13 | 5712 - 6187 | 52 | 24752 | 13.831 |
| 14 | 6188 - 6663 | 53 | 25228 | 14.086 |
| 15 | 6664 - 7139 | 54 | 25704 | 14.362 |
| 16 | 7140 - 7615 | 55 | 26180 | 14.626 |
| 17 | 7616 - 8091 | 56 | 26656 | 14.914 |
| 18 | 8092 - 8567 | 57 | 27132 | 15.130 |
| 19 | 8568 - 9043 | 58 | 27608 | 15.467 |
| 20 | 9044 - 9519 | 59 | 28084 | 15.694 |
| 21 | 9520 - 9999 | 60 | 28800 | 15.950 |
| | | | TOTAL SEC. 500,040 x 512 B/S = 256.02 MB | |

FIG.14

CRC FOR ID FIELDS

THE 16 CHECK BITS OF THE CRC OF THE ID FIELD SHALL BE COMPUTED OVER THE FIRST THREE BYTES OF THIS FIELD. THE GENERATOR POLYNOMIAL SHALL BE:

$$G(x) = x^{16} + x^{12} + x^5 + 1.$$

THE RESIDUAL POLYNOMIAL IS DEFINED BY:

$$R(x) = \left( \sum_{i=8}^{i=23} \overline{b}_i \, x^i + \sum_{i=0}^{i=7} b_i \, x^i \right) x^{16} \bmod G(x).$$

WHERE $b_i$ DENOTES A BIT OF THE FIRST THREE BYTES AND $\overline{b}_i$ AN INVERTED BIT. BIT $b_{23}$ IS THE HIGHEST ORDER BIT OF THE FIRST BYTE.

THE CONTENTS OF THE 16 CHECK BITS $c_k$ OF THE CRC ARE DEFINED BY:

$$R_C(x) = \sum_{k=0}^{k=15} c_k \, x^k.$$

$c_{15}$ IS RECORDED IN THE HIGHEST ORDER BIT OF THE FOURTH BYTE IN THE ID FIELD.

FIG.15

| 8 BIT BYTE | | ENCODED | 8 BIT BYTE | | ENCODED |
|---|---|---|---|---|---|
| HEX | BINARY | 9 BIT BYTE | HEX | BINARY | 9 BIT BYTE |
| 00 | 00000000 | 011001011 | 40 | 01000000 | 010001011 |
| 01 | 00000001 | 011001001 | 41 | 01000001 | 010001001 |
| 02 | 00000010 | 001001101 | 42 | 01000010 | 010010010 |
| 03 | 00000011 | 101100011 | 43 | 01000011 | 010010011 |
| 04 | 00000100 | 011001010 | 44 | 01000100 | 010001010 |
| 05 | 00000101 | 101100101 | 45 | 01000101 | 010010101 |
| 06 | 00000110 | 101100110 | 46 | 01000110 | 010010110 |
| 07 | 00000111 | 101100111 | 47 | 01000111 | 010010111 |
| 08 | 00001000 | 011001111 | 48 | 01001000 | 010001111 |
| 09 | 00001001 | 101101001 | 49 | 01001001 | 010011001 |
| 0A | 00001010 | 101101010 | 4A | 01001010 | 010011010 |
| 0B | 00001011 | 101101011 | 4B | 01001011 | 010011011 |
| 0C | 00001100 | 011001110 | 4C | 01001100 | 010001110 |
| 0D | 00001101 | 101101101 | 4D | 01001101 | 010011101 |
| 0E | 00001110 | 101101110 | 4E | 01001110 | 010011110 |
| 0F | 00001111 | 101101111 | 4F | 01001111 | 010011111 |
| 10 | 00010000 | 001001011 | 50 | 01010000 | 011100101 |
| 11 | 00010001 | 001001001 | 51 | 01010001 | 001100101 |
| 12 | 00010010 | 011001101 | 52 | 01010010 | 010110010 |
| 13 | 00010011 | 100100011 | 53 | 01010011 | 010110011 |
| 14 | 00010100 | 001001010 | 54 | 01010100 | 010100101 |
| 15 | 00010101 | 100100101 | 55 | 01010101 | 010110101 |
| 16 | 00010110 | 100100110 | 56 | 01010110 | 010110110 |
| 17 | 00010111 | 100100111 | 57 | 01010111 | 010110111 |
| 18 | 00011000 | 001001111 | 58 | 01011000 | 111100101 |
| 19 | 00011001 | 100101001 | 59 | 01011001 | 010111001 |
| 1A | 00011010 | 100101010 | 5A | 01011010 | 010111010 |
| 1B | 00011011 | 100101011 | 5B | 01011011 | 010111011 |
| 1C | 00011100 | 001001110 | 5C | 01011100 | 110100101 |
| 1D | 00011101 | 100101101 | 5D | 01011101 | 010111101 |
| 1E | 00011110 | 100101110 | 5E | 01011110 | 010111110 |
| 1F | 00011111 | 100101111 | 5F | 01011111 | 010111111 |

FIG.16A(1)

| | | | | | |
|---|---|---|---|---|---|
| 20 | 00100000 | 101001111 | 60 | 01100000 | 011100110 |
| 21 | 00100001 | 101001101 | 61 | 01100001 | 001100110 |
| 22 | 00100010 | 001010010 | 62 | 01100010 | 011010010 |
| 23 | 00100011 | 001010011 | 63 | 01100011 | 011010011 |
| 24 | 00100100 | 101001110 | 64 | 01100100 | 010100110 |
| 25 | 00100101 | 001010101 | 65 | 01100101 | 011010101 |
| 26 | 00100110 | 001010110 | 66 | 01100110 | 011010110 |
| 27 | 00100111 | 001010111 | 67 | 01100111 | 011010111 |
| 28 | 00101000 | 101001011 | 68 | 01101000 | 111100110 |
| 29 | 00101001 | 001011001 | 69 | 01101001 | 011011001 |
| 2A | 00101010 | 001011010 | 6A | 01101010 | 011011010 |
| 2B | 00101011 | 001011011 | 6B | 01101011 | 011011011 |
| 2C | 00101100 | 101001010 | 6C | 01101100 | 110100110 |
| 2D | 00101101 | 001011101 | 6D | 01101101 | 011011101 |
| 2E | 00101110 | 001011110 | 6E | 01101110 | 011011110 |
| 2F | 00101111 | 001011111 | 6F | 01101111 | 011011111 |
| 30 | 00110000 | 011100011 | 70 | 01110000 | 011100111 |
| 31 | 00110001 | 001100011 | 71 | 01110001 | 001100111 |
| 32 | 00110010 | 001110010 | 72 | 01110010 | 011110010 |
| 33 | 00110011 | 001110011 | 73 | 01110011 | 011110011 |
| 34 | 00110100 | 010100011 | 74 | 01110100 | 010100111 |
| 35 | 00110101 | 001110101 | 75 | 01110101 | 011110101 |
| 36 | 00110110 | 001110110 | 76 | 01110110 | 011110110 |
| 37 | 00110111 | 001110111 | 77 | 01110111 | 011110111 |
| 38 | 00111000 | 111100011 | 78 | 01111000 | 111100111 |
| 39 | 00111001 | 001111001 | 79 | 01111001 | 011111001 |
| 3A | 00111010 | 001111010 | 7A | 01111010 | 011111010 |
| 3B | 00111011 | 001111011 | 7B | 01111011 | 011111011 |
| 3C | 00111100 | 110100011 | 7C | 01111100 | 110100111 |
| 3D | 00111101 | 001111101 | 7D | 01111101 | 011111101 |
| 3E | 00111110 | 001111110 | 7E | 01111110 | 011111110 |
| 3F | 00111111 | 001111111 | 7F | 01111111 | 011111111 |
| POSITION IN BYTE | 8          1 | 9          1 | POSITION IN BYTE | 8          1 | 9          1 |

FIG.16A(2)

| 8 BIT BYTE | | ENCODED | 8 BIT BYTE | | ENCODED |
|---|---|---|---|---|---|
| HEX | BINARY | 9 BIT BYTE | HEX | BINARY | 9 BIT BYTE |
| 80 | 10000000 | 111001011 | C0 | 11000000 | 110001011 |
| 81 | 10000001 | 111001001 | C1 | 11000001 | 110001001 |
| 82 | 10000010 | 100010010 | C2 | 11000010 | 110010010 |
| 83 | 10000011 | 100010011 | C3 | 11000011 | 110010011 |
| 84 | 10000100 | 111001010 | C4 | 11000100 | 110001010 |
| 85 | 10000101 | 100010101 | C5 | 11000101 | 110010101 |
| 86 | 10000110 | 100010110 | C6 | 11000110 | 110010110 |
| 87 | 10000111 | 100010111 | C7 | 11000111 | 110010111 |
| 88 | 10001000 | 111001111 | C8 | 11001000 | 110001111 |
| 89 | 10001001 | 100011001 | C9 | 11001001 | 110011001 |
| 8A | 10001010 | 100011010 | CA | 11001010 | 110011010 |
| 8B | 10001011 | 100011011 | CB | 11001011 | 110011011 |
| 8C | 10001100 | 111001110 | CC | 11001100 | 110001110 |
| 8D | 10001101 | 100011101 | CD | 11001101 | 110011101 |
| 8E | 10001110 | 100011110 | CE | 11001110 | 110011110 |
| 8F | 10001111 | 100011111 | CF | 11001111 | 110011111 |
| 90 | 10010000 | 011101001 | D0 | 11010000 | 011101101 |
| 91 | 10010001 | 001101001 | D1 | 11010001 | 001101101 |
| 92 | 10010010 | 100110010 | D2 | 11010010 | 110110010 |
| 93 | 10010011 | 100110011 | D3 | 11010011 | 110110011 |
| 94 | 10010100 | 010101001 | D4 | 11010100 | 010101101 |
| 95 | 10010101 | 100110101 | D5 | 11010101 | 110110101 |
| 96 | 10010110 | 100110110 | D6 | 11010110 | 110110110 |
| 97 | 10010111 | 100110111 | D7 | 11010111 | 110110111 |
| 98 | 10011000 | 111101001 | D8 | 11011000 | 111101101 |
| 99 | 10011001 | 100111001 | D9 | 11011001 | 110111001 |
| 9A | 10011010 | 100111010 | DA | 11011010 | 110111010 |
| 9B | 10011011 | 100111011 | DB | 11011011 | 110111011 |
| 9C | 10011100 | 110101001 | DC | 11011100 | 110101101 |
| 9D | 10011101 | 100111101 | DD | 11011101 | 110111101 |
| 9E | 10011110 | 100111110 | DE | 11011110 | 110111110 |
| 9F | 10011111 | 100111111 | DF | 11011111 | 110111111 |

FIG.16B(1)

| | | | | | |
|---|---|---|---|---|---|
| A0 | 10100000 | 011101010 | E0 | 11100000 | 011101110 |
| A1 | 10100001 | 001101010 | E1 | 11100001 | 001101110 |
| A2 | 10100010 | 101010010 | E2 | 11100010 | 111010010 |
| A3 | 10100011 | 101010011 | E3 | 11100011 | 111010011 |
| A4 | 10100100 | 010101010 | E4 | 11100100 | 010101110 |
| A5 | 10100101 | 101010101 | E5 | 11100101 | 111010101 |
| A6 | 10100110 | 101010110 | E6 | 11100110 | 111010110 |
| A7 | 10100111 | 101010111 | E7 | 11100111 | 111010111 |
| A8 | 10101000 | 111101010 | E8 | 11101000 | 111101110 |
| A9 | 10101001 | 101011001 | E9 | 11101001 | 111011001 |
| AA | 10101010 | 101011010 | EA | 11101010 | 111011010 |
| AB | 10101011 | 101011011 | EB | 11101011 | 111011011 |
| AC | 10101100 | 110101010 | EC | 11101100 | 110101110 |
| AD | 10101101 | 101011101 | ED | 11101101 | 111011101 |
| AE | 10101110 | 101011110 | EE | 11101110 | 111011110 |
| AF | 10101111 | 101011111 | EF | 11101111 | 111011111 |
| B0 | 10110000 | 011101011 | F0 | 11110000 | 011101111 |
| B1 | 10110001 | 001101011 | F1 | 11110001 | 001101111 |
| B2 | 10110010 | 101110010 | F2 | 11110010 | 111110010 |
| B3 | 10110011 | 101110011 | F3 | 11110011 | 111110011 |
| B4 | 10110100 | 010101011 | F4 | 11110100 | 010101111 |
| B5 | 10110101 | 101110101 | F5 | 11110101 | 111110101 |
| B6 | 10110110 | 101110110 | F6 | 11110110 | 111110110 |
| B7 | 10110111 | 101110111 | F7 | 11110111 | 111110111 |
| B8 | 10111000 | 111101011 | F8 | 11111000 | 111101111 |
| B9 | 10111001 | 101111001 | F9 | 11111001 | 111111001 |
| BA | 10111010 | 101111010 | FA | 11111010 | 111111010 |
| BB | 10111011 | 101111011 | FB | 11111011 | 111111011 |
| BC | 10111100 | 110101011 | FC | 11111100 | 110101111 |
| BD | 10111101 | 101111101 | FD | 11111101 | 111111101 |
| BE | 10111110 | 101111110 | FE | 11111110 | 111111110 |
| BF | 10111111 | 101111111 | FF | 11111111 | 111111111 |
| POSITION IN BYTE | 8       1 | 9       1 | POSITION IN BYTE | 8       1 | 9       1 |

<u>FIG.16B(2)</u>

STORING DATA ON A MEDIUM IN AN OPTICAL SYSTEM

CROSS REFERENCE TO RELATED APPLICATIONS

This application is a divisional of U.S. application Ser. No. 09/921,805, filed Aug. 3, 2001, which is a continuation of Ser. No. 09/228,245, filed Jan. 11, 1999, now U.S. Pat. No. 6,343,061 which is a divisional of U.S. application Ser. No. 08/475,241, filed Jun. 7, 1995, now U.S. Pat. No. 5,859,825, which is a divisional of U.S. application Ser. No. 07/964,518, filed Jan. 25, 1993, now U.S. Pat. No. 5,537,379.

BACKGROUND OF THE INVENTION

This invention relates to digital data storage and retrieval and, more particularly, an optical data storage and retrieval system and method.

Recordable/erasable optical disks are currently available for use as data storage media. Magneto-optical recording is the technique commonly used to store the data on and/or retrieve the data from the disk. During recording, a magnetic field orients the polarity of a generalized area on the disk, while a laser pulse heats a localized area thereby fixing the polarity of the smaller area. The localized area with fixed polarity is commonly called a pit. Some encoding systems use the existence or absence of a pit on the disk to define the recorded data as a 1 or 0, respectively. The most commonly used encoding system for this pit-type recording is the run length limited (RLL) 2,7 code because it gives the highest data-to-pit ratio. This type of recording, however, does not lead to higher density because amplitude and timing margins deteriorate very rapidly-as frequency is increased.

SUMMARY OF THE INVENTION

According to a feature of the invention, a method for storing and retrieving digital data on an optical disk is provided. For writing on the disk, a binary signal having first and second binary values at a given clock interval is generated. Energizing pulses that have a duration less than the clock interval are generated during each clock interval having one of the binary values. The energizing pulses turn a laser beam on and off depending on the value of the binary signal. The laser beam is focused on a recording surface of a rotating disk such that the laser beam can selectively access one of a plurality of concentric or spiral tracks on the recording surface.

For reading data on a disk, a focused laser beam is directed at the recording surface of a rotating optical disk such that the laser beam can selectively access one of a plurality of tracks on the recorded surface. The rotation of the laser beam reflected off of the recorded surface is detected by means of Kerr rotation. A change in Kerr rotation to the first type represents the first binary value. A change in Kerr rotation to the second type represents the second binary value. A binary signal that represents the binary values that occur at a clock interval generated from the occurrences of the binary values and changes in rotation occurring at boundaries of the clock interval is generated.

An apparatus for recording data on an optical disk is provided. A source originates digital data at a given clock interval. A circuit converts the data to a binary signal having first and second binary values at a given clock interval and representative of the data. A pulse generator produces energizing pulses having a duration less than a clock interval for converted data having the first binary value. A laser controller applies the energizing pulses to a laser to turn the focused laser beam on and off responsive to the energizing pulses. A circuit directs the laser at a recording surface on a rotating optical data storage disk, such that the laser beam can selectively access one of a plurality of tracks on the recording surface.

An apparatus for reading data on an optical disk is provided. A circuit rotates an optical data storage disk having a recorded surface. A controller directs a laser with a focused beam at the recorded surface such that the laser beam can selectively access-one of a plurality of tracks on the recorded surface. A circuit detects the rotation of the laser beam reflected off of the recorded surface. A decoder converts changes in rotation of a first and second type into first and second binary values, respectively. A circuit generates a binary signal that represents the binary values that occur at a clock interval generated from the occurrences of the binary values and changes in rotation occurring at boundaries of the clock interval.

An optical data storage and retrieval system is provided with data recording and reading utilizing cell boundary transition codes, special signal processing, and control of write pulses. Specifically, a data encoder encodes digital data in a code where transitions occur only at cell boundaries. A cell is defined as the encoded bits that represent one data bit. For example, in RLL 2,7, bits can be recorded at the cell boundary or at the center of the cell. The detection window is +/−25% of a cell. Preferably in this invention, a pulse group code recording (GCR) 8/9 code is used. Because eight data bits are encoded into nine bits, a cell is effectively defined as one data bit. For this invention, a cell will occur at each clock interval. The detection window becomes +/−50% of the cell. Furthermore, the GCR 8/9 code allows a limited number of consecutive zeros, e.g., three, even across word boundaries. This code also contains self clocking.

With certain data patterns, the timing margin can be enhanced. A monitor that looks for data sequences which match these predetermined data patterns is included. When one of these data patterns occurs, the laser is pulsed earlier, preferably 4 to 6 nanoseconds. Under normal writing, the laser is pulsed uniformly. With some data patterns an increase in effective write power creates better defined edges. A second monitor looks for these data sequences and when one occurs, the laser will not be pulsed off as it would under other data patterns. Thus, the effective write power is increased.

To reduce the asymmetry of the rise and fall of an isolated pulse, signal processing will be performed for reshaping the read data waveform. For example, the pulse will be narrowed and amplified. The preferred embodiment differentiates the amplified read waveform. The amplified signal is summed with its derivative resulting in a narrowed and symmetrical pulse.

For lower frequency signals, the pulse slimming will produce overshoot. Because this overshoot is predictable, the threshold of the read circuitry can be increased momentarily to prevent false data reads. A monitor will monitor the reshaped waveform, and, upon the occurrence of an overshoot, the monitor will increase the threshold of the read waveform detector.

According to another feature of the invention, an optical data storage and retrieval system is provided with downward compatibility from a high-density recording format to a low-density, ANSI format. Specifically, a first write encoder encodes digital data in a first, preferably high-density format. A second write encoder encodes digital data in a second (i.e., ANSI) format. A first read decoder decodes digital data from the first format. A second read decoder decodes digital data from the second format. A disk drive receives a 90 millimeter replaceable optical disk. A read/write head reads encoded data from and writes encoded data to a 90 millimeter optical disk received by the drive. In a first mode, the first encoder is connected between a source of digital data and the read/write head, and the first decoder is connected between the read/write head and the utilizing apparatus. In a second mode, the second encoder is connected between the source and the read/write head, and the second decoder is connected between the read/write head and the utilizing apparatus. Control electronics switch between the first and second modes, depending upon the format in which data is recorded on the disk received by the disk drive. As a result, the system can exploit high-density recording formats, while achieving downward compatibility to the low-density, ANSI format. Thus, data can be stored and retrieved in different formats in a single system that employs the same read/write head and disk drive.

According to yet another feature of the invention, the first and second formats are organized into sectors having the same number of bytes, there being more sectors in the first format than in the second format in accordance with the higher density. As a result, the same interface electronics can be employed to store and retrieve data in both formats.

BRIEF DESCRIPTION OF THE DRAWINGS

FIG. 9 is a schematic diagram for the dynamic threshold circuit;

FIG. 14 is a table depicting, for each of the 21 zones in the preferred format of the high-density optical disk, the tracks within the zone, the number of sectors per track within the zone, the total number of sectors in the zone, and the write frequency of the data recorded in the zone;

FIG. 15 provides the equations used to compute the CRC bits of the ID field;

DETAILED DESCRIPTION

Figure 1:
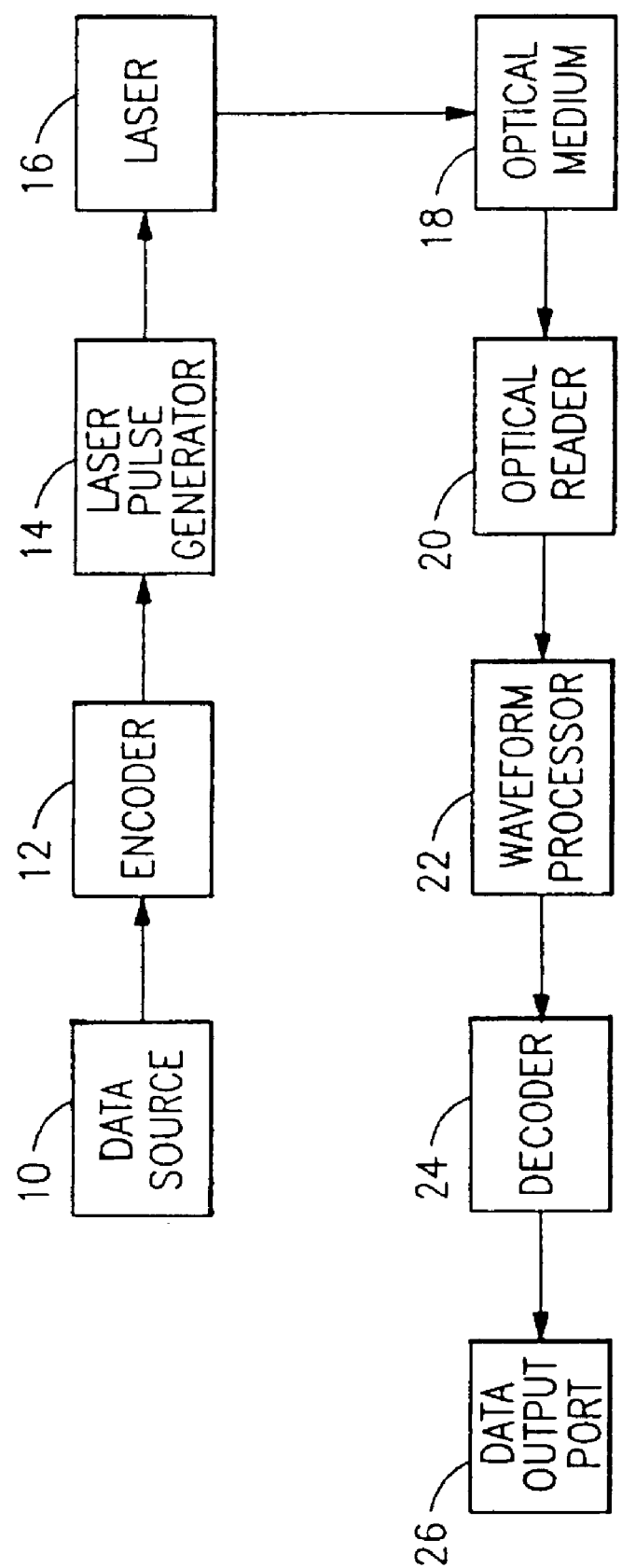
FIG. 1 is a block diagram showing the optical data storage and retrieval system.

In FIG. 1, during the write mode, a data source 10 transmits data to an encoder 1 2. The encoder 12 converts the binary data into binary code bits. The code bits are then transmitted to a laser pulse generator 14, where the code bits are converted to energizing pulses for turning a laser 16 on and off. In the preferred embodiment, a code bit 1 indicates that the laser will be pulsed on for a fixed duration independent of the code bit pattern. However, depending on the laser and optical medium being used, performance may be enhanced by adjusting the occurrence of the laser pulse or by extending the otherwise uniform pulse duration. The output of laser 16 heats localized areas of an optical medium 18, which is being exposed to a magnetic flux that sets the polarity of the magnetic material on the optical medium 18. During reads of the optical medium, a laser beam is impinged on the surface of the medium. The polarization of the reflected laser beam will be dependent upon the polarity of the magnetic surface of the optical medium.

During the read mode, the reflected laser beam will be inputted into an optical reader 20, where the read code output will be sent to the waveform processor 22. The processed read code will be sent to a decoder 24, where output data will be transmitted to a data output port 26 for transmission.

Figure 2:
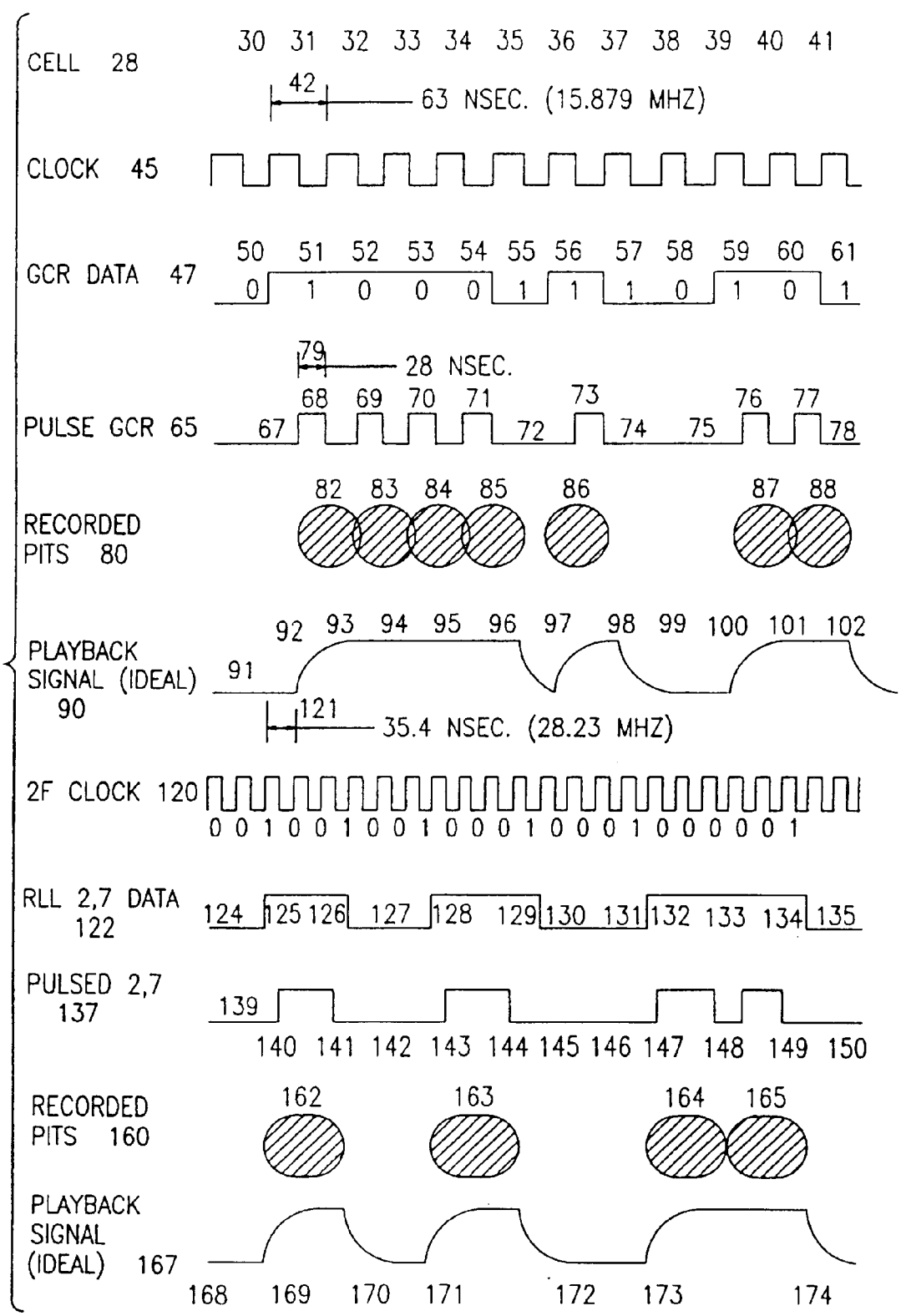
FIG. 2 is a series of waveforms showing uniform laser pulsing under a pulsed GCR format and non uniform laser pulsing under an RLL 2,7 format.

FIG. 2 depicts the differences between the laser pulsing in GCR 8/9 and RLL 2,7 code formats. In GCR 8/9, a cell 28 is defined as a code word corresponding to a data bit. For GCR 8/9, a cell is equal to one data bit. Thus, cells 30 through 41 each correspond to one clock period 42 of clock waveform 45. For a 3½ optical disk rotating at 2,400 revolutions per minute (RPM) with a storage capacity of 256 Mbytes, clock period 42 will typically be 63 nanoseconds or a clock frequency of 15.879 MHz. GCR data waveform 47 is the encoded data output from the encoder 12. A representative data sequence is depicted in FIG. 2. The code data sequence 010001110101 is shown in GCR data 50 through 61, where GCR data 50 is low. GCR data 51 is high. GCR data 52 is high and so forth for GCR data 53 through 61. Pulse GCR waveform 65 is the output from laser pulse means 14 inputted into pulse laser 16. In practicing the invention, a non-return-to-zero driving signal is utilized to energize the magnetic recording head. Thus, the magnetization of the optical medium reverses polarity as the laser is pulsed on and off and the data is recorded. Pulse GCR waveform 65 as shown has not been adjusted in time or duration to reflect performance enhancement for specific data patterns. Pulse GCR 67 through 78 reflect no pulse when the corresponding GCR data 47 is low and reflect a pulse when GCR data 47 is high. For example, pulse GCR 67 has no pulse because GCR data 50 is low. Conversely, pulse GCR 68, 69, 70, and 71 show a laser pulse because GCR data 51 through 54 are each high, respectively, and similarly for pulse GCR 72 through 78. Under the depicted uniform scenario, pulse GCR pulse width 79 is uniform for pulse GCR 68, 69, 70, 71, 73, 76, and 77. For the preferred embodiment, this pulse width is 28 nanoseconds. Each laser pulse corresponding to pulse GCR waveform 65 creates a recorded pit on optical medium 18. Recorded pit 82 corresponds to pulse GCR 68. Recorded pit 83 corresponds to pulse GCR 69. Similarly, recorded pits 84 through 88 correspond to pulse GCR 70, 71, 73, 76, and 77, respectively.

Because of thermal dissipation and spot size on the optical medium 18, the recorded pits 80 are wider in time than pulse GCR 65. Successive recorded pits 80 merge together to effectively create a larger recorded pit. Thus, the elongated recorded pit has a leading edge, corresponding to the first recorded pit, and a trailing edge, corresponding to the last recorded pit. For example, the pit created by recorded pits 82 through 85 has a leading edge from recorded pit 82 and a trailing edge from pit 85. Under the GCR 8/9 data format, a leading edge corresponds to GCR data 47 going high, and a trailing edge corresponds to GCR data 47 going low. Hence, for data pattern 110001 as shown by GCR data 5135 through 55, a leading edge occurs for the first 1, (GCR data 47 going high) as shown by recorded pit 82; and, at the end of the GCR data 54, a trailing edge occurs as shown by recorded pit 85, because GCR data 55 is low.

Playback signal 90 will be low when recorded pits 80 shows no pits. At the leading edge of a pit, playback signal 90 will rise and remain high until the trailing edge of the pit is reached. The signal will go low and remain low until the next pit. For example, playback signal 91 is low because GCR data 50, which is low, did not create a pit. At the front edge of recorded pit 82, playback signal 90 has a leading edge as shown in playback signal 92. Playback signal 90 will then remain unchanged until a trailing edge occurs on a recorded pit. For example, because recorded pits 83 and 84 show no trailing edge, playback signals 93 and 94 remain high. The signal remains high during playback signal 95 because of recorded pit 85. However, because GCR data 55 is low, recorded pit 85 creates a trailing edge. Thus, playback signal 96 decays. The signal will decay to 0 until a recorded pit occurs, creating a leading edge. Thus, with the occurrence of recorded pit 86, which corresponds to GCR data 56 being high, playback signal 97 rises. Because there is no immediate successor to recorded pit 86 when GCR data 57 is low, playback signal 98 decays. Playback signal 99 remains low because there is no recorded pit when GCR data 58 is low. With GCR data 59 and 60 being high, recorded pits 87 and 88 overlap creating one larger pit. Thus, playback signal 100 rises and playback signal 101 remains high. Playback signal 102 falls at the trailing edge of recorded pit 88 when GCR data 61 is low.

For RLL 2,7 a cell consists of two data bits, which corresponds to two clock periods 121 of 2F clock waveform 120. For a 256 Mbyte disk, an RLL 2,7 encoding format will require a 2F clock pulse width 121 of 35.4 nanoseconds or a clock frequency of 28.23 MHz. The calculation of this value is straightforward. In order to maintain the same disk density, the GCR 8/9 and RLL 2,7 encoding formats must contain the same amount of information in the same recording time. Because two code bits are required per data bit in the RLL 2,7 format, it requires a clock frequency approximately twice that of the GCR data format. The GCR data format records nine bits of code bits per eight bits of data. Thus, the GCR data bit clock is nine-eighths of the clock period 42. Thus, for a GCR clock period 42 of 63 nanoseconds, the RLL 2, 7 pulse width 121 must be 35.4 nanoseconds in order to maintain the same disk density.

The RLL 2,7 data waveform 122 reflects two code bits per cell. For example, RLL 2,7 data 124 shows a data pattern 00 while RLL 2,7 data 125 shows a data pattern 10 In this data format, a 1 represents a transition in data. Thus, RLL 2,7 data 125 goes high when the 1 occurs in the data pattern. Similarly, RLL 2,7 data 126 goes low when the 1 occurs in the data pattern. While a 0 occurs, RLL 2,7 data 122 remains in the same state. Pulsed 2,7 waveform 137 reflects the pulsing of laser 16 corresponding to RLL 2,7 data 122. Thus, for RLL 2,7 data 125 and 126, during the period when that signal is high, pulsed 2,7 waveform 140 and 141 is high. Because of the thermal elongation of the pit, pulsed 2,7 waveform 141 goes low prior in time to RLL 2,7 data 126. For longer data patterns of 0, the pulsing must remain on. For example, during the data pattern 10001 as shown in RLL 2,7 data 128 and 129, pulsed 2,7 waveform 143 and 144 remains high longer than pulsed 2,7 waveform 140 and 141. For data patterns of successive 0, the pulsed 2,7 waveform 137 can be pulsed as separate pulses. For example, for the data pattern 1000001, RLL 2,7 data 132, 133, and 134 can be pulsed in two separate pulses as shown in pulsed 2,7 147, 148, and 149.

As with the CCR 8/9 format, recorded pits 160 show thermal elongation. For example, recorded pit 162 is wider in time than the pulse from pulsed 2,7 waveform 140 and 141; a similar result may be seen for recorded pit 163. Physical limitations of existing lasers and optical disks prevent recorded pit 163 from being recorded in two successive pulses at 2F clock 120 frequency. Thus, for these intermediate size pits, the thermal accumulation distortion effects will be greater than in either recorded pit 162 or the combined recorded pits 164 and 165. Again, playback signal 167, depicted by playback signal 168 through 174, goes high on leading edges of recorded pits 160, decays on trailing edges of recorded pits 160, and remains constant during the presence or absence of pits.

Figure 3:
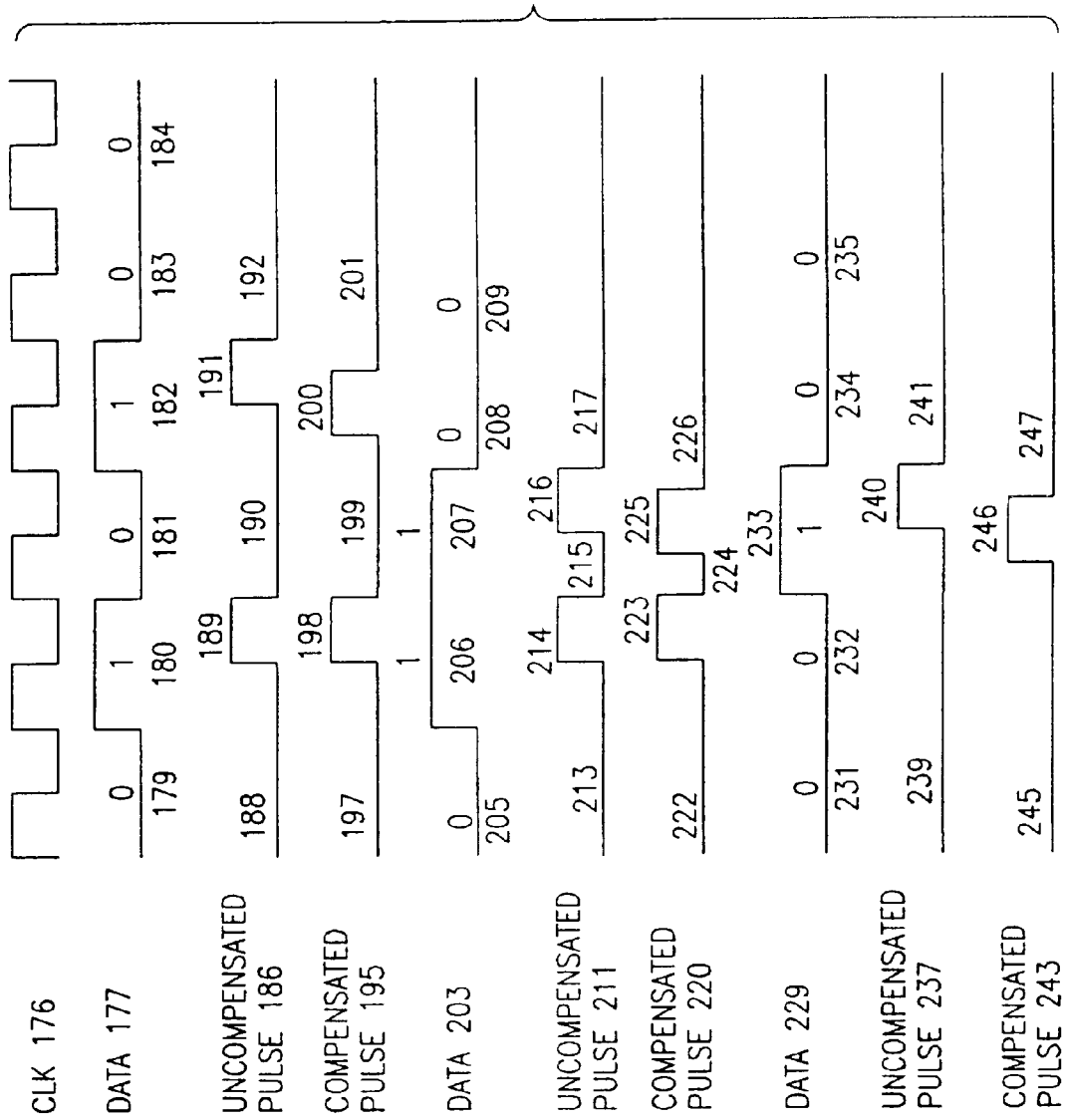
FIG. 3 is a series of waveforms showing laser pulsing for various data patterns adjusted by the write compensation circuit.

The pulsed GCR code can be improved by correcting predictable position shifts. FIG. 3 shows the timing diagram for the write compensation of the laser pulse generator 14. Experimental testing showed that recording early when the laser 16 is off for two bits or greater enhances performance. Clock waveform 176 is the code bit clock used for clocking data 177, 203, and 229, which show the worst case data patterns for enhancement. Other patterns can be corrected, but will suffer in signal amplitude. Data 180 through 184 correspond to the data sequence 10100 The uncompensated pulse waveforms 188 through 192 correspond to this data pattern without write compensation. Uncompensated pulse waveforms 189 and 191 occur in the second half of the clock period. After write compensation, the output of laser pulse generator 14 corresponds to compensated pulse waveform 195, where compensated pulse waveforms 197 and 198 remain unchanged, and a shortened off-period for compensated pulse waveform 199 provides an earlier compensated pulse waveform 200. During compensated pulse 201, laser 16 remains off for a longer duration than uncompensated pulse 192. Similarly, for data 206 through 209, corresponding to data pattern 1100, uncompensated pulse waveform 211 would be off for uncompensated pulse waveform 213 followed by two pulses, i.e., uncompensated pulse waveforms 214 and 216. Again, the write compensation circuit adjusts compensated pulse waveform 220 so that compensated pulse waveform 225 will occur closer in time to compensated pulse waveform 223 so that compensated pulse waveform 224 is shorter than uncompensated pulse-waveform 215. Finally, data 231 through 235, corresponding to the data pattern 00100, have uncompensated pulse waveform 237 occurring at uncompensated pulse waveform 240. Write compensation would move compensated pulse waveform 243 earlier in time to compensated pulse waveform 246.

Figure 4:
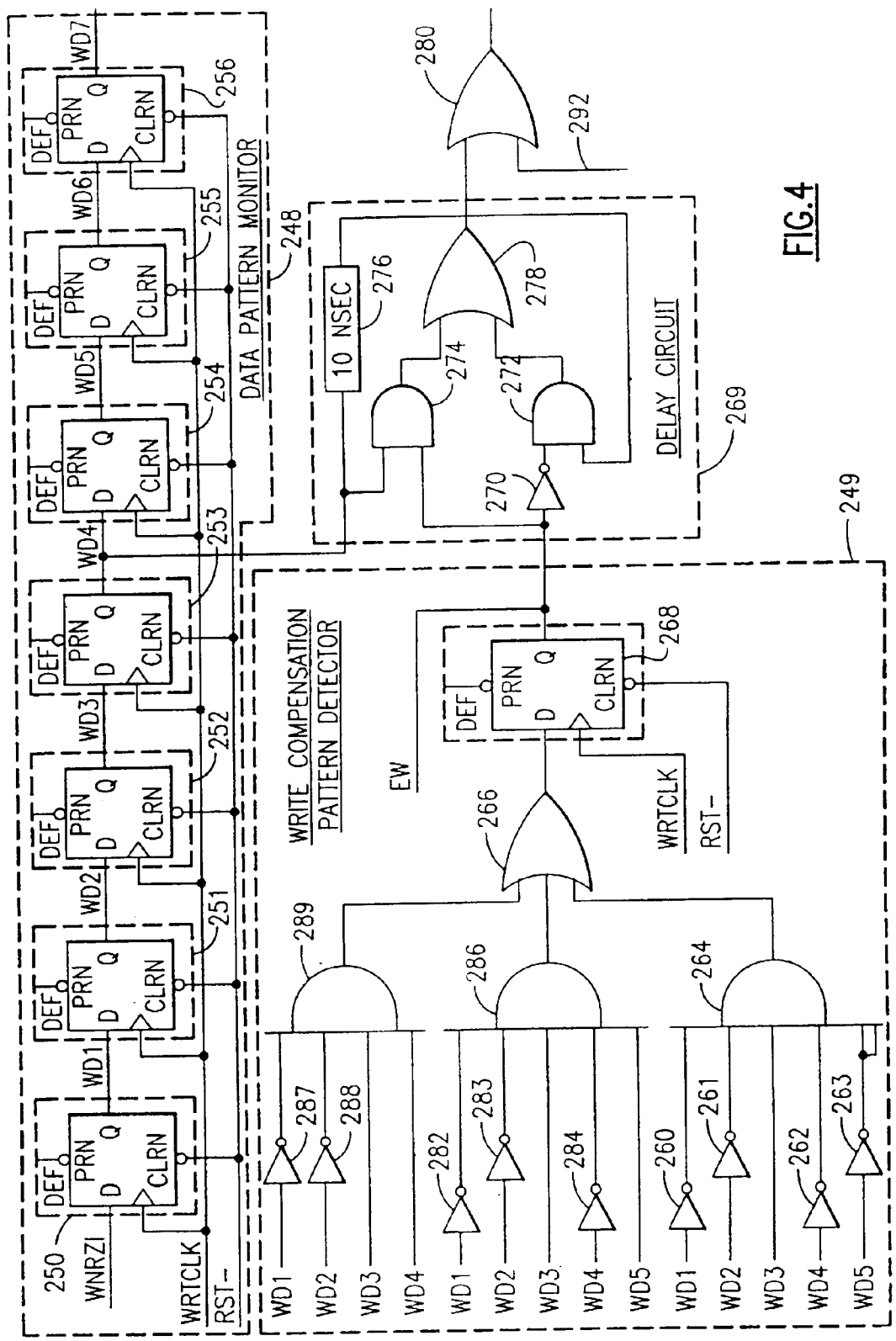
FIG. 4 is a schematic diagram showing the write compensation circuit.

FIG. 4 shows the schematic diagram of the write compensation circuit, which comprises data pattern monitor 248, write compensation pattern detector 249, and delay circuit 269. Data pattern monitor 248 is a serial shift register that sequentially clocks encoded data from encoding means 12. The last five clocked in data bits are sent to write compensation pattern detector 249, where they are analyzed for determining whether to pulse the laser earlier than normal.

Data pattern monitor 248 consists of data sequence D flip-flops 250 through 256.

Encoded data is input into the D port of data sequence D flip-flop 250, whose Q output WD1 becomes the input of the D port of data sequence D flip-flop 251. This clocking continues through data sequence D flip-flops 252 through 256, whose Q output WD7 is the data sequence delayed by seven clock periods from when it was first input into data pattern monitor 248. The Q outputs WD1, WD2, WD3, WD4, and WD5 of data sequence D flip-flops 250 through 254, respectively, represent the last five of the last seven data bits inputted into a data pattern monitor 248. These five bits are sent to a write compensation pattern detector 249, where they are compared to predetermined data patterns; and, if they match, an enable write signal is sent to a delay circuit 269 to indicate that the laser pulse is to occur earlier than normal.

The first data pattern is detected by inverting the Q data WD1, WD2, WD4, and WD5 from data sequence D flip flops 250, 251, 253, and 254, respectively, through data inverters 260, 261, 262, and 263, respectively. The output of these inverters is AND'ed with the output from data sequence D flip-flop 252 in detect AND gate 264. Thus, when a sequence 00100 occurs, the output of detect AND gate 264 goes high, indicating that a detect of the data pattern occurred. Similarly, the second data pattern is detected by inverting the Q outputs WD1, WD2, and WD4 from data sequence D flip-flops 250, 251, and 253, respectively, through the data inverters 282, 283, and 284, respectively, and AND'ing these inverted outputs with the outputs WD3 and WD5 of data sequence D flip-flops 252 and 254 in detect AND gate 286. Thus, a data pattern of 010100, will trigger a high from detect AND gate 286, indicating a detect. The third data sequence is detected by inverting the Q outputs WD1 and WD2 from data sequence D flip-flops 250 and 251, respectively, through data inverters 287 and 288 and AND'ing these inverted outputs with the Q outputs WD3 and WD4 from data sequence D flip-flops 252 and 253, respectively, in data detect AND gate 289. Thus, the data pattern of 1100 will trigger a detect from detect AND gate 289, indicating the presence of the data. The data pattern detect output of detect AND gates 264, 286, and 289 is OR'ed in detected pattern OR gate 266, whose output goes high when one of the three data patterns is detected. The detected pattern output is clocked in enable write D flip-flop 268, whose Q output, the enable write signal, is then sent to delay circuit 269.

Delay circuit 269 takes the clocked data output WD4 of data sequence D flip-flop 253 and simultaneously inputs it into delay circuit 276 and not-delay-select AND gate 274. The delayed output of delay circuit 276 is inputted into delay-select AND gate 272. The enable write signal from write compensation pattern detector 249 will enable either delay-select AND gate 272 or not-delay-select AND gate 274. When the enable write signal is low, which indicates that one of the three data patterns has not occurred, it is inverted by enable write inverter 270. This allows the delayed data from delay circuit 276 to be clocked. On the other hand, if enable write is high, which indicates that one of the three data patterns has occurred, then the not-delay-select AND gate 274 allows the transmission of the data from data sequence D flip-flop 253, which is undelayed. The output from delay-select AND 272 and not-delay-select AND gate 274 is OR'ed in data OR gate 278, where it is outputted from delay circuit 269. Although prior discussions about the write compensation circuit or timing indicated that for the three data patterns, the write pulse would occur 10 nanoseconds earlier, in actual implementation, data is delayed 10 nanoseconds for all data but the three data patterns. The delay of delay circuit 276 is set between 8 to 12 nanoseconds for the frequency of the preferred embodiment.

When recording lower frequency data patterns, the resultant magneto-optical signal has a slower rise time than fall time. This causes the final output from the waveform processor 22 to have degraded amplitude on positive peaks, which can be corrected by recording with higher effective power at the leading edge of the data pattern. For the preferred embodiment, the data pattern 000111, will trigger a wide-write signal during the second 1 of the data pattern, thereby pulsing the laser during its normal off period.

Figure 5:
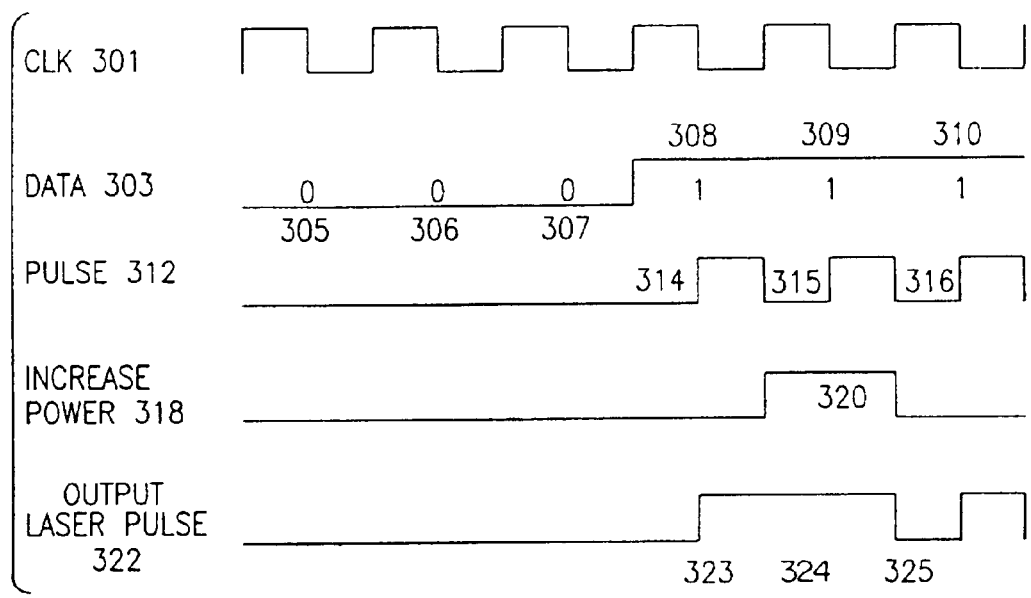
FIG. 5 is a series of waveforms showing laser pulsing for amplitude asymmetry correction.

In FIG. 5, clock waveform 301 clocks data waveform 303 through the laser pulse generator 14 for the data pattern 000111 As depicted by data 305 through 310, the laser pulse generator 14 generates pulse waveform 312 with pulses 314, 315, and 316 when data waveform 303 is a *During the second 1 of this data pattern, the laser pulse generator 14 will turn on for the increase power waveform 318 and generate a pulse 320. The output laser pulse waveform 322 results from the OR of pulse 312 and turn on for the increase power waveform 318 that creates laser pulses 323, 324, and 325. Under normal operations, laser pulse 324 would be off during the first half of the clock period. However, under this particular data pattern, keeping the laser on for the laser pulses 323 and 324, effectively increases the power fifty percent during this time period.

Figure 6:
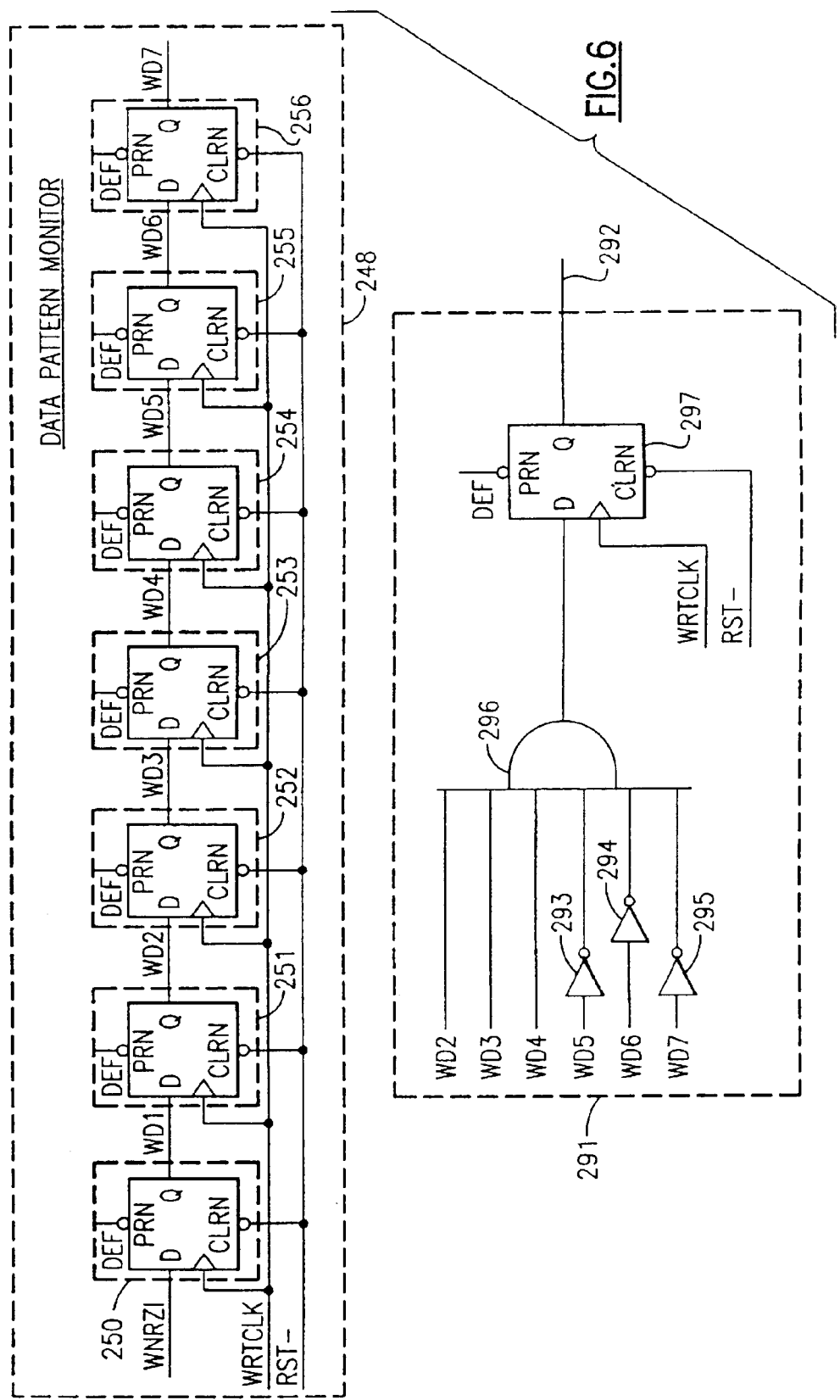
FIG. 6 is a schematic diagram showing the amplitude asymmetry correction circuit.

In FIG. 6, amplitude asymmetry correction circuit 291 generates the write-wide pulse 292 (corresponds to increase power waveform 318 in FIG. 5), which will be OR"ed with the laser pulse output from delay circuit 269 (corresponds to pulse waveform 312 in FIG. 5) in laser pulse OR gate 280 (FIG. 4), resulting in output laser pulse waveform 322. The data pattern monitor 248 operates as shown in FIG. 4. The Q outputs WD2, WD3, WD4, WD5, WD6, and WD7 of data sequence D flip-flops 251 through 256, respectively, are inputted into the amplitude asymmetry correction circuit 291, where the outputs WDS, WD6, and WD7 of data sequence D flip-flops 254, 255, and 256, respectively, are inverted in data inverters 293, 294, and 295, respectively. The outputs of data inverters 293, 294, and 295 and data sequence D flip-flops 251, 252, and 253 are AND'ed in detect AND gate 296. The output of detect AND gate 296 indicates a detected pattern form 000111, which will be clocked out of write-wide D flip-flop 297 at the next clock 301.

Figure 7:
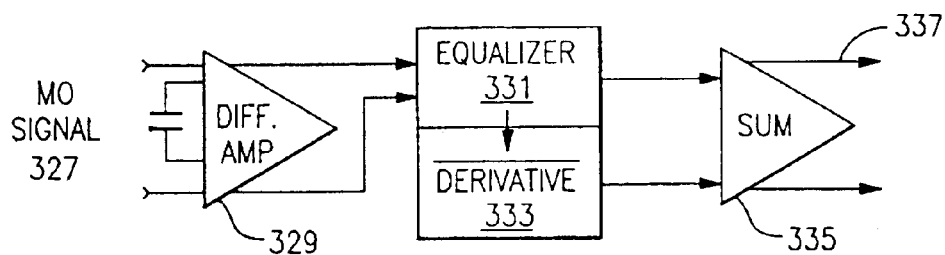
FIG. 7 is a block diagram showing the basic relationship of elements of the pulse slimming means.

The waveform output of the optical reader 20 will be degraded as a function of frequency and data pattern. Amplitude and timing can be enhanced by processing the signal through the waveform processor 22. The asymmetry of the rise and fall times of an isolated pulse can be improved by summing an equalized, differentiated signal with its derivative. In FIG. 7, magneto-optical signal 327 is differentiated by a differential amplifier 329. The differentiated signal is inputted into an equalizer 331, where it is equalized by 5 dB in the preferred embodiment, and the amplitude is equalized as a function of frequency. The derivative of the equalized signal is taken by a derivative processor 333 and summed with the equalized signal in an adder 335. The output of the adder 335 is the read signal 337.

Figure 8:
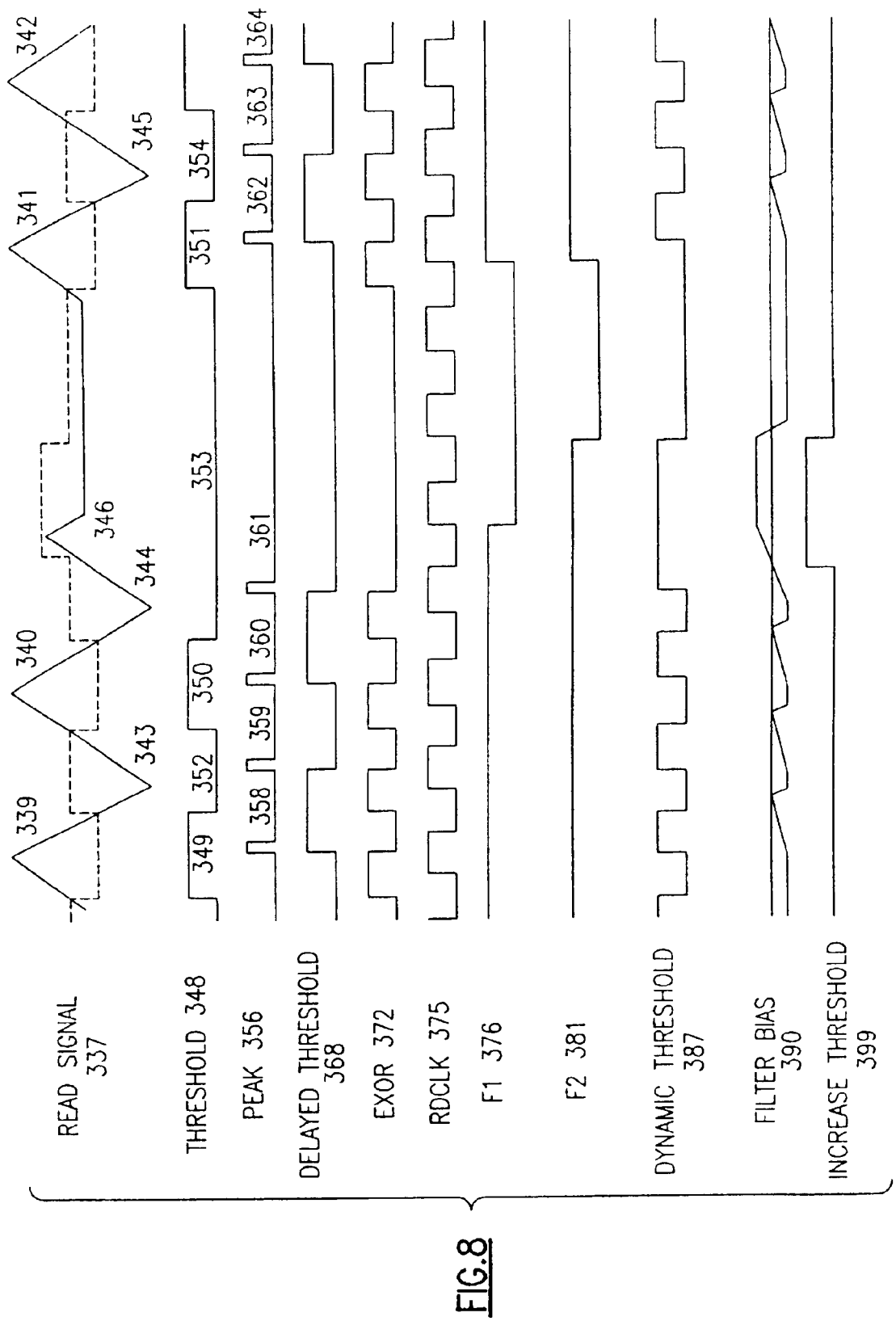
FIG. 8 is a series of waveforms showing threshold adjustments by the dynamic threshold circuit.

FIG. 8 shows the timing diagram for the dynamic threshold circuit shown in FIG. 9.

Read signal 337 will contain an overshoot produced by the pulse slimming. Because this overshoot is predictable, the threshold for the read circuitry can be increased during the overshoot to prevent false data reads during positive peaks 339, 340, 341, and 342, and during negative peaks 343, 344, and 345 of read signal 337. Threshold waveform 348 is switched high during positive peaks. Threshold waveforms 349, 350, and 351 are high during positive peaks 339, 340, and 341, respectively. Threshold waveforms 352, 353, and 354 are low during negative peaks 343, 344, and 345, respectively. Each peak, whether positive or negative, of the read signal 337 generates peak waveform 356, which is a short clocking pulse that occurs shortly after the read signal 337 peaks. Peaks 339, 343, 340, 344, 341, 345, and 342 of the read signal 337 generate peak waveforms 358 through 364, respectively.

As shown in FIG. 9, threshold waveform 348 is inputted into the D port of threshold delay D flip-flop 366. Peak waveform 356 clocks threshold waveform 348 through this flip-flop. Delayed threshold waveform 368 is the Q output of threshold delay D flip-flop 366, which is exclusively OR'ed with threshold waveform 348 in threshold-exclusive OR gate 370. The EXOR signal 372 is the output of threshold-exclusive OR gate 370. The EXOR signal 372 has twice the frequency of the original threshold waveform 348. The EXOR signal 372 is inputted into the D port of EXOR D flip-flop 374, where it is clocked at read clock 375. F1 waveform 376 is the Q output of EXOR D flip-flop 374. Read clock waveform 375 has a leading edge during high pulses of EXOR signal 372, except when EXOR signal 372 is low for more than one read clock waveform 375. Thus, the F1 waveform 376 is high except for the time between the first read clock 375 pulse after the EXOR signal 372 is low for more than one read clock 375 and the next EXOR signal 372 pulse.

F1 waveform 376 is OR'ed with the EXOR signal 372 in envelope OR gate 378. The output of envelope OR gate 378 is high except for the time from the first read clock 375 after the EXOR signal 372 has been low for more than one clock period until the signal 372 goes high again. The output of envelope OR gate 378 is clocked through the D input of envelope D flip-flop 379, which is clocked by read clock 375. The Q output of the envelope D flip-flop 379 is F2 waveform 381. The F2 waveform 381 is high except from the second read clock 375 period after the EXOR signal 372 goes low until the next read clock 375 clocks a high for the EXOR signal 372. The F2 waveform 381 is inverted through the F2 inverter 383 and NOR'ed with the EXOR signal 372 in dynamic threshold NOR gate 385 to produce the dynamic threshold waveform 387. The dynamic threshold waveform 387 is high any time the EXOR signal 372 is low, except when the F2 waveform 381 is low. Thus, the dynamic threshold waveform 387 has an on-time less than a half read clock 375 period except when the EXOR signal 372 is low on the next read clock 375 period. For this exception, the dynamic threshold waveform 387 stays high from the end of the EXOR signal 372 until the second read clock 375 pulse.

The dynamic threshold waveform 387 is used to forward or reverse bias a biasing diode 389. When dynamic threshold 387 is high, biasing diode 389 is reverse biased. Conversely, when the dynamic threshold waveform 387 is low, the biasing diode 389 is forward biased.

When the dynamic threshold waveform 387 forward biases the biasing diode 389 (i.e., is low), the potential of the filter bias signal 390 is higher by the junction voltage of the biasing diode 389. This potential is 0.6 volts for standard devices. The 5-volt supply voltage drops across the limiting resistor 393 to the potential of the filter bias signal 390, because the voltage across the charging capacitor 394 is the difference between the filter bias signal 390 and ground. The charging capacitor 394 charges up to this potential, which is also the base voltage of a transistor 395. This turns on the transistor 395, causing the voltage drop across a limiting resistor 392 to be almost 5 volts. Because the emitters of the transistors 355 and 396 are connected, the emitter voltage of the transistor 396 is less than the 2.5-volt base voltage of the transistor 396. Accordingly, the transistor 396 is off so that the collector voltage across the collector resistor 397 produces an increase threshold waveform 399 which is low. The increase threshold waveform 399 is the signal that increases the threshold of the read signal 377 detector during periods of overshoot.

When the dynamic threshold waveform 387 is high, the biasing diode 389 is reversed biased, thereby no longer grounding the base of the transistor 395. When the dynamic threshold waveform 387 goes high, the charging capacitor 394 starts charging, creating a potential at the base of the transistor 395 that will rise exponentially up to the supply voltage, 5 volts. As the filter bias signal 390 rises in voltage, the voltage at the emitter of the transistor 395 increases, which equally increases the emitter voltage of the transistor 396. When this emitter voltage exceeds the base voltage by the junction potential across the emitter-to-base junction, the transistor 396 is turned on. Turning on the transistor 396 causes the increase threshold waveform 399 to go high.

Under normal operations, the dynamic threshold waveform 387 is pulsed as described above. During normal read signals, the dynamic threshold 387 is on for a period equivalent to the on-period of read clock 375. The charge time for the voltage across the charging capacitor 394 to exceed the base voltage of 2.5 volts is longer than this half clock period of time. Thus, under normal circumstances, the increase threshold waveform 399 remains low. However, during periods of overshoot, the dynamic threshold waveform 399 is on for a longer period of time, thereby allowing the charging capacitor 394 to charge to a voltage that exceeds 2.5 volts, thereby triggering the increase threshold waveform 399 to go high.

Figure 10:
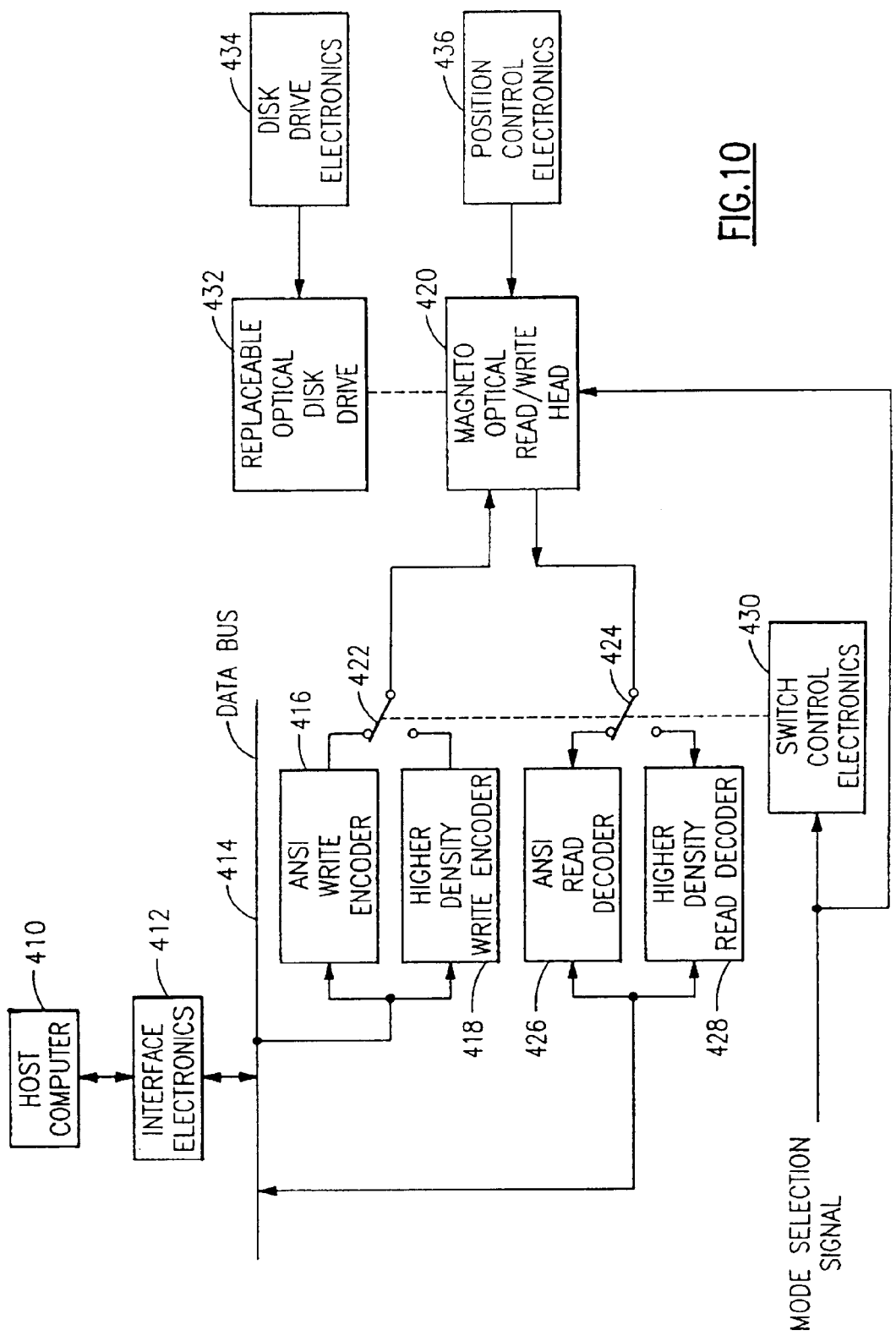
FIG. 10 is a schematic block diagram of an optical data storage and retrieval system incorporating downward compatibility.

In FIG. 10, a host computer 410, which serves as a source and utilizer of digital data, is coupled by interface electronics 412 to a data bus 414. As host computer 410 processes data, and it wants to access external memory from time to time, a connection is established through interface electronics 412 to data bus 414. Data bus 414 is coupled to the input of a write encoder 416 and the input of a write encoder 418.

Preferably, write encoder 416 encodes data from bus 414 in a low-density (i.e., ANSI) format; and write encoder 418 encodes data from data bus 414 in a higher density format. The *Draft Proposal for* 90 *MM Rewritable Optical Disk Cartridges for Information Interchange*, dated Jan. 1, 1991, which describes the ANSI format, is incorporated herein by reference. The outputs of write encoders 416 and 418 are coupled alternatively through a switch 422 to the write input of a magneto-optical read/write head 420. The read output of head 420 is coupled alternatively through a switch 424 to the inputs of a read decoder 426 and a read decoder 428. Read decoder 426 decodes data in the same format, i.e., ANSI, as write encoder 416; and read decoder 428 decodes data in the same format as write encoder 418. Preferably, the encoding and decoding technique disclosed above is employed to implement write encoder 418 and read decoder 428. The outputs of decoders 426 and 428 are connected to data bus 414.

Responsive to a mode—selection signal, switch—control electronics 430 set the states of switches 422 and 424 into either a first mode or a second mode. In the first mode, write encoder 418 and read decoder 428 are connected between data bus 414 and read/write head 420. In the second mode, write encoder 416 and read decoder 426 are connected between data bus 414 and read/write head 420. Read/write head 420 reads encoded data from and writes encoded data to a 90 millimeter optical disk received by a replaceable optical disk drive 432, which is controlled 5 by disk-drive electronics 434. Read/write head 420 is transported radially across the surface of the disk received by disk drive 432 by position-control electronics 436.

When a 90 millimeter disk in a high-density format is received by disk drive 432, a mode-selection signal sets the system in the first mode. As a result, data from host computer 410, to be stored on the disk, is organized by interface electronics 412 and encoded by write encoder 418; data read from the disk is decoded by read decoder 428, reorganized by interface electronics 412, and transmitted to host computer 410 for processing.

When a 90 millimeter disk in the low-density, ANSI format is received by disk drive 432, a mode-selection signal sets the system in the second mode. As a result, data from host computer 410, to be stored on the disk, is organized by interface electronics 412 and encoded by write encoder 416; data read from the disk is decoded by read decoder 426, reorganized by interface electronics 412, and transmitted to host computer 410 for processing.

Preferably, irrespective of the format used to store data, the mode-selection signal is stored on each and every disk in one format, e.g., the low-density, ANSI format, and the system defaults to the corresponding mode, e.g., the second mode. The mode-selection signal could be recorded in the control track zone in ANSI format. When a disk is installed in disk drive 432, disk-drive electronics 434 initially controls position-control electronics 436 to read the area of the disk on which the mode-selection signal is stored. Read decoder 426 reproduces the mode-selection signal, which is applied to switch-control electronics 430. If the installed disk has the low-density, ANSI format, then the system remains in the second mode when the mode-selection signal is read. If the installed disk has the high-density format, then the system switches to the first mode when the mode-selection signal is read.

In certain cases, it may be desirable to modify the laser for the first and second modes. For example, different laser frequencies could be used or different laser-focussing lens systems could be used for the different modes. In such case, the mode-selection signal is also coupled to read/write head 420 to control the conversion between frequencies or optical-lens focussing systems, as the case may be.

It is preferable to organize the data stored in both formats to have the same number of bytes per sector, i.e., in the case of ANSI, 512 bytes. In such case, the same interface electronics 412 can be used to organize the data stored on and retrieved from the disks in both formats.

In accordance with the invention, the same read/write head 420, position-control electronics 436, optical disk 20 drive 432, disk-drive electronics 434, interface electronics 412, and data bus 414 can be employed to store data on and retrieve data from optical disks in different formats. As a result, downward compatibility from higher-density formats that are being developed as the state of the art advances, to the industry standard ANSI format can be realized using the same equipment.

Figure 11:
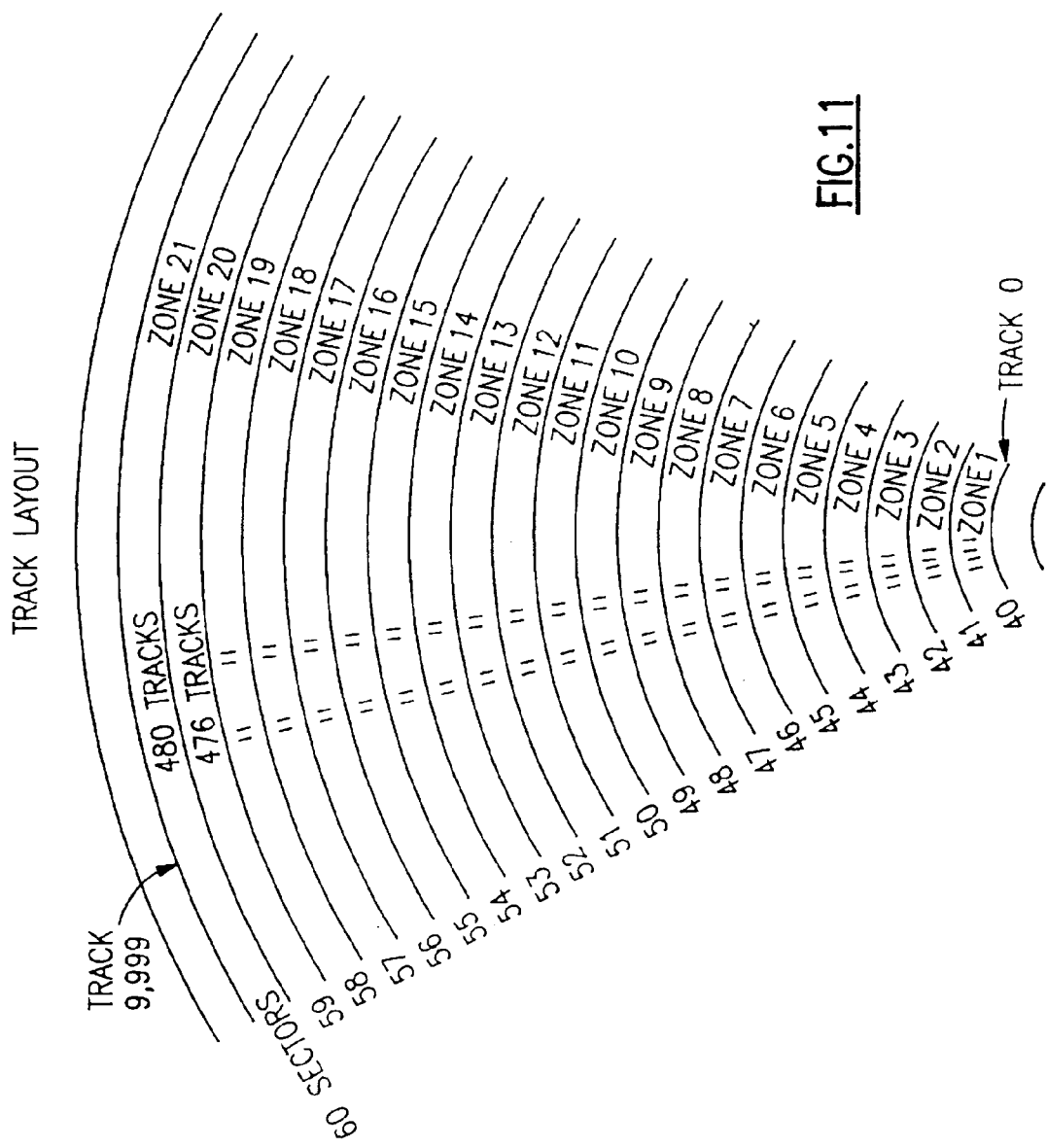
FIG. 11 is a diagram of the track layout of the highoptical disks.
Figure 12:
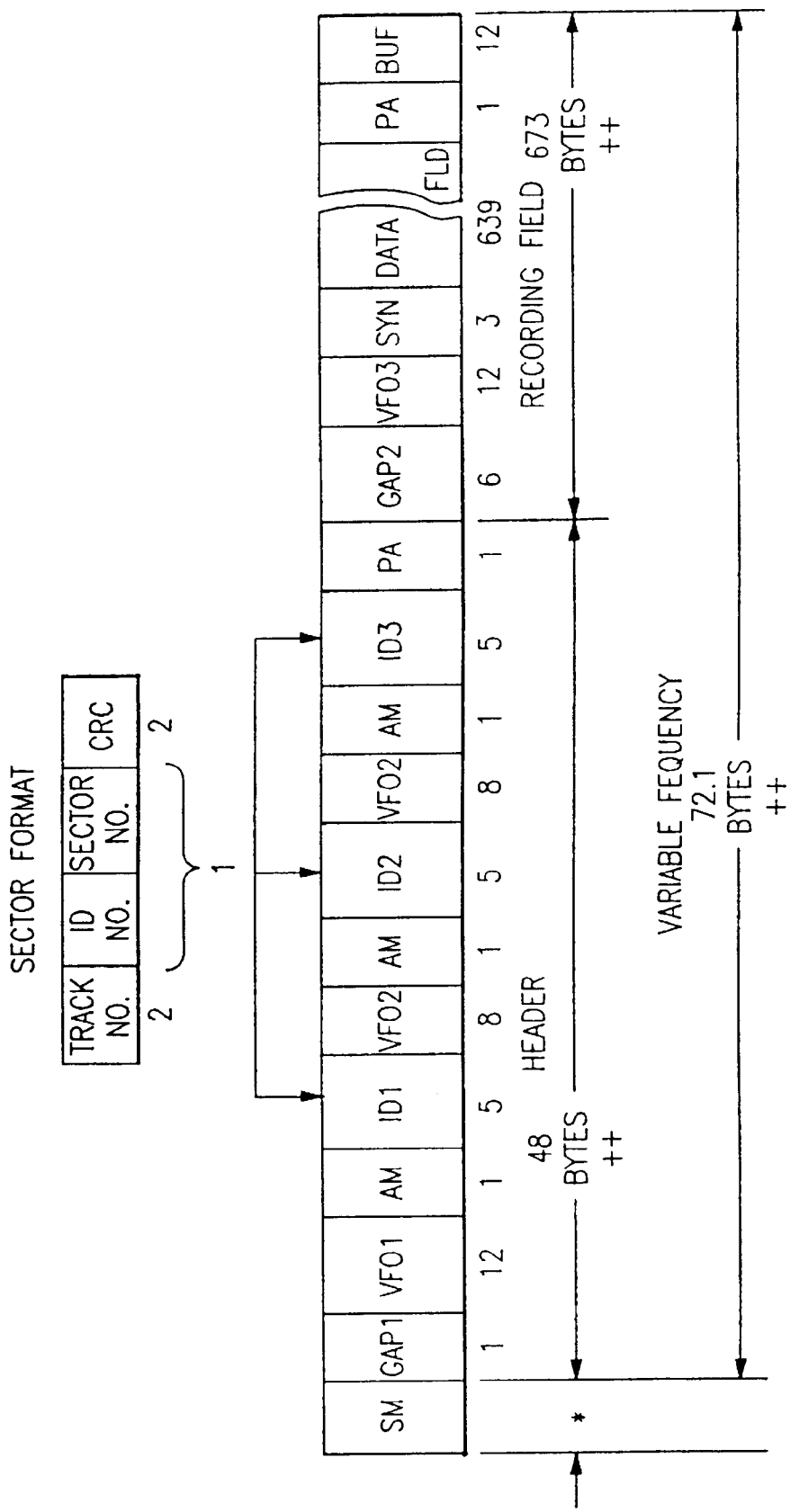
FIG. 12 is a diagram of the sector format of the high-density optical disks.

With reference to FIGS. 11, 12, and 14, the preferred format of the high-density optical disk will now be described. There are ten thousand tracks, namely tracks 0 to 9999, arranged in 21 zones. Each track is divided into a plurality of sectors. There are a different number of sectors in each zone, increasing in number moving outwardly on the disk. The frequency of the data recorded in each zone is also different, increasing in frequency moving outwardly on the disk. (See FIGS. 11 and 14 for a description of the number of tracks in each zone, the number of sectors in each zone, and the recording frequency in each zone.) In contrast to the low-density disks, the format markings are erasably recorded on the disk using the same recording technique as is used for the data, preferably magneto-optical (MO). These format markings comprise sector fields, header fields for each sector, and control tracks. In contrast to the header fields and the data, the sector fields for all the zones are recorded at the same frequency. A description of the preferred embodiment of the sector format follows.

Sector Layout

A sector comprises a sector mark, a header, and a recording field in which 512 user data bytes can be recorded. The recording field can be empty or user-written. The total length of a sector is 721 bytes (one byte is equivalent to nine channel bits) of header and recording fields at a frequency that varies from zone to zone, plus 80 channel bits of sector mark at a fixed frequency, i.e., the same frequency for each zone. Tolerances are taken up by the buffer, i.e., the last field of the sector. The length of the header field is 48 bytes. The length of the recording field is 673 bytes.

Sector Mark (SM)

The sector mark consists of a pattern that does not occur in data, and is intended to enable the drive to identify the start of the sector without recourse to a phase-locked loop. The sector marks are recorded with a fixed frequency of 11.6 MHz for all zones. The length of the sector mark is 80 channel bits. The following diagram shows the pattern in the NRZI format.

| | | | |
|---|---|---|---|
| 1111 | 1111 | 1100 | 0000 |
| 1111 | 1100 | 0000 | 0000 |
| 0000 | 1111 | 1100 | 0000 |
| 1111 | 1100 | 0000 | 1111 |
| 1111 | 1100 | 1001 | 0010 |

VFO Fields

There are four fields designated either $VFO_1$, $VFO_2$ or $VFO_3$ to give the voltage-frequency-oscillator of the phase-locked loop of the read channel bit synchronization. The information in $VFO_1$ and $VFO_3$ is identical in pattern and has the same length of 108 bits. The two fields designated $VFO_2$ each have a length of 72 bits.

The continuous channel bit pattern for VFO fields is:
Standard—101010101010 . . .
Optional—111111111111 . . .

Address Mark (AM)

The address mark consists of a pattern that does not occur in data. The field is intended to give the disk drive the drive-byte synchronization for the following ID field. It has a length of 9 bits with the following pattern:

110000101

ID Fields

The three ID fields each contain the address of the sector, i.e., the track number and the sector number of the sector, and CRC bytes. Each field consists of five bytes with the following contents:

| | |
|---|---|
| 1st and 2nd byte | MSB, LSB of the track number |
| 3rd byte bits 7 and 6 | 00 shall indicate field $ID_1$ |
| | 01 shall indicate field $ID_2$ |
| | 10 shall indicate field $ID_3$ |
| bit 5 | shall be set to ZERO |
| bits 4 to 0 | shall number in binary notation |
| 4th and 5th byte | CRC field containing the CRC bits computed over the first three bytes according to FIG. 15 |

Postambles (PA)

The postamble fields are equal in length, both having 9 bits. There is a postamble following $ID_3$ and a postamble following the data field. A postamble allows closure of the last byte of the preceding CRC or data field. The postambles (PA) have 9 bits of the following pattern:

00010001

Gaps

GAP 1 is a field with a nominal length of 9-channel bits, and GAP 2 is of 54 channel bits. GAP 1 shall be zeroes and GAP 2 not specified. GAP 2 is the first field of the recording field, and gives the disk drive some time for processing after it has finished reading the header and before it has to write or read the $VFO_3$ field.

Sync

The sync field allows the drive to obtain byte synchronization for the following data field. It has a length of 27 bits and is recorded with the bit pattern:

101000111110110001111000111

Data Field

The data field is used to record user data. It has a length of 639 bytes (one byte=9 channel bits) and comprises:

[t3]

512 bytes of user data 4 bytes the contents of which are not specified by this standard and shall be ignored in interchange 4 bytes of CRC parity 80 bytes of ECC parity and 39 bytes for resynchronization

User Data Bytes

The user data bytes are at the disposal of the user for recording information.

CRC and ECC Bytes

The Cyclic Redundancy Check (CRC) bytes and Error Correction Code (ECC) bytes are used by the error detection and correction system to rectify erroneous data. The ECC is a Reed-Solomon code of degree 16.

Resync Bytes

The resync bytes enable a drive to regain byte synchronization after a large defect in the data field. It has a length of 9 bits with the following pattern:

100010001

Their content and location in the data field is as follows: The resync field $R5_n$ is inserted between bytes

[t4] A15n+1, where $1 \leq n \leq 39$

Buffer Field

The buffer field has a length of 108 channel bits.

Figure 16A:
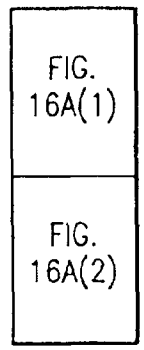
FIG. 16a is the first half of a table (Hex 00 to 7F) showing how the 8-bit bytes in the three address fields and in the data field, except for the resync bytes, are converted to channel bits on the disk.
Figure 16B:
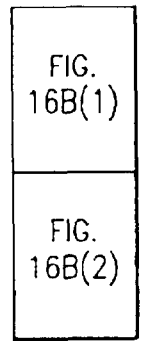
FIG. 16b is the second half of a table (Hex 80 to FF) showing how the 8-bit bytes in the three address fields and in the data field, except for the resync bytes, are converted to channel bits on the disk.

The 8-bit bytes in the three address fields and in the data field, except for the resync bytes, are converted to channel bits on the disk according to FIGS. 16a and 16b. All other fields in a sector are as defined above in terms of channel bits. The recording code used to record all data in the information regions on the disk is Group-Code (GCR 8/9) per ANSI Recorded Standard X3B5/86-123.

Figure 13:
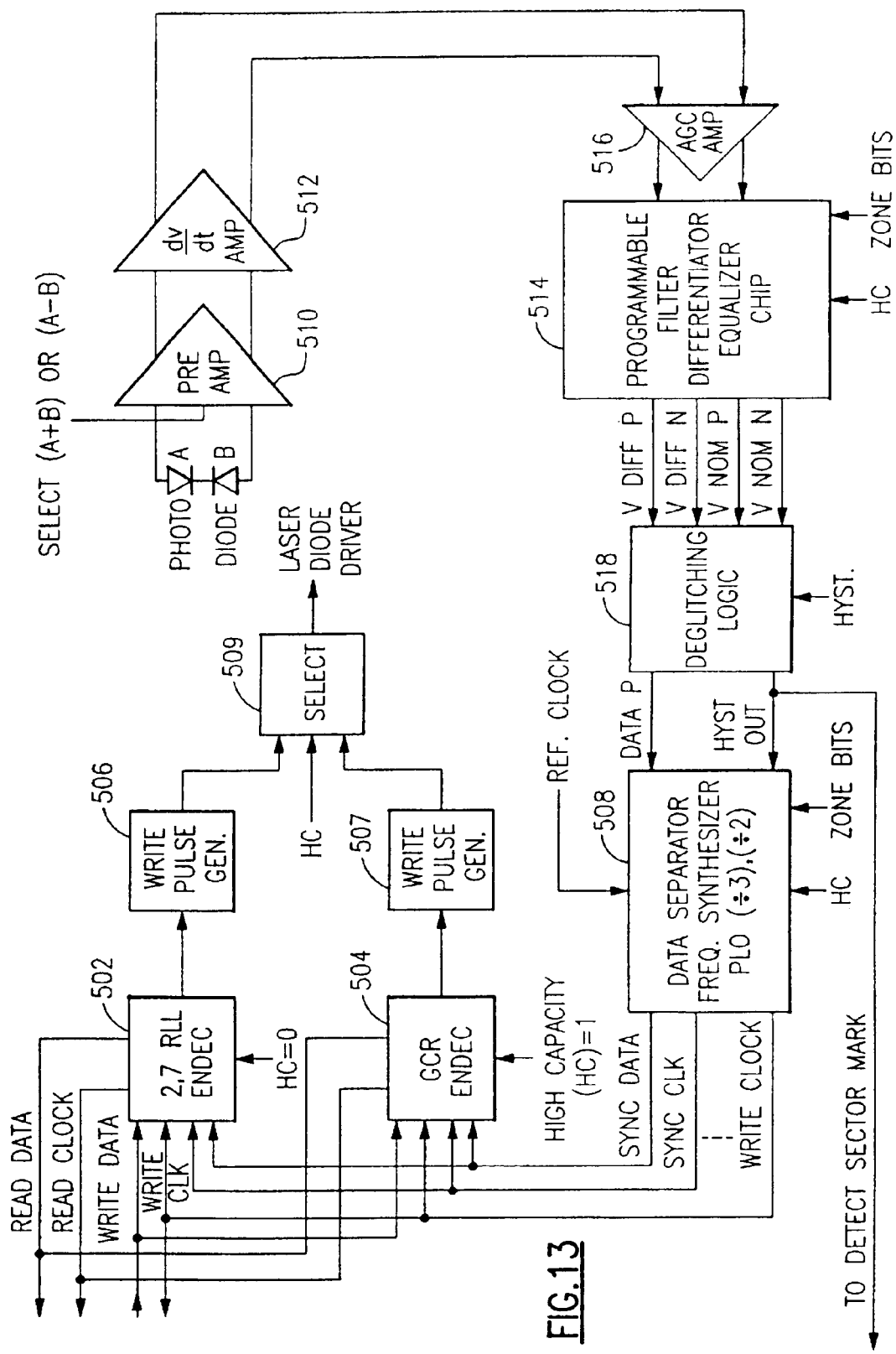
FIG. 13 is a block diagram in more detail showing the read/write circuitry of FIG. 10.

In FIG. 13, the write data is decoded by the RLL 2,7 encoder/decoder (ENDEC) 502 for the low-capacity, 128 Mbyte (low-density) mode. The GCR encoder/decoder (ENDEC) 504 is used in the high-capacity, 256 Mbyte (high-density) mode. The write pulse generator 506 produces a pulse width of 86 nsec with write power level varying from 7.0 mW to 8.5 mW from the inner to the outer zones for the low-capacity mode. For the high-capacity mode, the write pulse generator 507 decreases the pulse width to 28 nsec, but the write power is increased to a level that varies from 9.0 mW to 10.0 mW from the inner to the outer zones. The select circuit 509 alternatively couples pulse generator 506 or 507 to the laser diode driver of the magneto-optical read/write head, depending upon the state of an applied control bit HC. Control bit HC equals zero in the low-capacity mode and equals one in the high-capacity mode. The appropriate output is selected to drive the laser diode driver. The write clock is generated by the frequency synthesizer in the data separator 508. The frequency is set to 11.6 MHz for the low-capacity mode and 10.59 MHz to 15.95 MHz from inner to outer zones for the high-capacity mode.

During the playback, the preamplifier 510, which is fed by the photodiodes in the magneto-optical read/write head, can be selected for the sum mode (A+B) or the difference mode (A−B). For the sum mode, the preamplifier 510 reads the reflectance change due to the preformatted pits. These pits are stamped in the RLL 2,7 code and identify the sector mark, VFO fields, and track sector data. There are 512 bytes of data recorded in each preformatted sector. There are 10,000 tracks, segmented into 25 sectors, which totals 128 Mbytes of data for the low-capacity mode. In the high-capacity mode, the disk is formatted with GCR code. There are 40 sectors at the inner zone (i.e., zone 1), and the number of sectors gradually increases to 60 sectors at the outer zone (i.e., zone 21). Again, 512 bytes of data are recorded in each sector, which totals 256 Mbytes of data.

The writing of data in the RLL 2,7 mode is also pit-type recording. When these pits are read in the difference mode (A−B), the waveform appearing at the output of the preamplifier is identical to the preformatted pits when read in the sum mode (A+B). This signal only needs to be differentiated once by the dv/dt amplifier 512. A pulse corresponding to approximately the center of each pit is generated by digitizing the nominal output (VNOM P, VNOM N) from the programmable filter. The filter cutoff frequency is set to 5.4 MHz for the low-capacity mode responsive to the HC control bit. The filtered signal is digitized and passed through the deglitching logic circuit 518. The resulting signal called HYSTOUT (Hysterisis) is fed to the data separator 508. The signal is also coupled to the system controller to detect the sector marks. Responsive to the HC control bit, the PLO divider of the frequency synthesizer in data separator 508 is set to 3, and the synthesizer is set to 11.6 MHz. The sync data is identical to the original data decoded by the RLL ENDEC 502. This is coupled to the RLL ENDEC 502 for comparison purposes and then to the data bus to be utilized.

In the high-capacity mode, the difference mode of preamplifier 510 is selected. The playback signal appearing at the output of the preamplifier is in the NRZ (non-return-to-zero) form and requires detection of both edges. This is accomplished by double differentiation by the dv/dt amplifier and the differentiator in the programmable filter chip 514 after passage through the AGC amplifier 516. The differentiator, a high-frequency filter cutoff, and an equalizer on chip 514 are activated by the HC control bit. The filter cutoff is adjusted depending upon zone-identification bits applied to chip 514. (The differentiator and equalizer in chip 514 are not used in the low-capacity mode.) The output signal (VDIFF P, VDIFF N) from chip 514 is digitized and deglitched in the deglitching logic circuit 518. This circuit suppresses low signal level noise. The threshold level is set by a HYST control signal applied to deglitching logic circuit 518. The DATA P output is fed to the data separator. Responsive to the HC control bit, the PLO divider is set to 2, and the synthesizer is set to the appropriate frequency as determined by the applied zone number bits from the system controller. The cutoff frequency of the programmable filter is also dependent on the zone bits, but only in the high-capacity mode. The sync data is identical to the original GCR decoded data. This is coupled to the GCR ENDEC 504 for comparison purposes and then to the data bus to be utilized. The entire read function is shared between the low- and high-capacity modes.

The RLL 2,7 ENDEC 502 and write pulse generator 506 are represented by write encoder 416 and read decoder 426 in FIG. 10. The GCR ENDEC 504 and write pulse generator 507 are represented by write encoder 418 and read decoder 428 in FIG. 10. Select circuit 509 is represented by switch 422 in FIG. 10. The internal control of ENDECs 502 and 504, which alternately activates them depending on the HC control bit, is represented by switch 424 in FIG. 10.

Preamplifier 510, amplifier 512, AGC amplifier 516, chip 514, deglitching logic circuit 518, and data separator 508 are employed in both the high-capacity and low-capacity. modes. Thus, they are represented in part by both read decoder 426 and read decoder 428.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. An apparatus comprising: an encoder for converting a binary data word to a binary code word in which encoded bits have first and second binary values at a predefined clock interval; a pulse generator responsive to the encoded bits so that energizing pulses having a uniform duration less than the clock interval are generated during each clock interval in which the encoded bits have the first binary value; and a laser responsive to the energizing pulses for recording on a medium.

2. The apparatus of claim 1 further comprising magnetic flux means for applying a magnetic flux to the medium during recording.

3. The apparatus of claim 1, further comprising a data monitor receiving as input the encoded bits and detecting an occurrence of a set of encoded bit pattern.

4. The apparatus of claim 3 further comprising:
a write compensation circuit capable of shifting selected energizing pulses earlier in time in response to the detection of the encoded bit pattern.

5. The apparatus of claim 4 wherein encoded bit pattern in the set includes a pattern of two consecutive encoded bits having the second binary value.

6. The apparatus of claim 5 wherein the first binary value corresponds to a 1 and the second binary value corresponds to a 0, and the set of encoded bit pattern comprises one of 1100, 10100, and 00100.

7. The apparatus of claim 4 wherein the selected energizing pulses are shifted in a time interval earlier in time.

8. The apparatus of claim 7 wherein the time interval is approximately 4 to 6 or 8 to 12 nanoseconds.

9. The apparatus of claim 4 wherein the selected energizing pulses are shifted earlier in time by delaying all non-selected energizing pulses.

10. The apparatus of claim 1 further comprising;
a data monitor receiving as an input the encoded bits and detecting an occurrence of an encoded bit pattern indicative of a low frequency component and capable of extending at least one of the energizing pulses in response thereto.

11. The apparatus of claim 10 wherein the first binary value corresponds to a 1 bit, and the second binary value corresponds to a 0 bit, and wherein the encoded bit pattern comprises 000111.

12. An apparatus comprising:
an encoder for converting a binary data word to a binary code word in which encoded bits have first and second binary values at a predefined clock interval;
a pulse generator responsive to the encoded bits for generating energizing pulses during each clock interval in which the encoded bits have the first binary value;
a first data monitor receiving as an input the encoded bits and detecting the occurrence of any one of a first set of encoded bit patterns indicative of a low frequency component and capable of extending at least one of the energizing pulses in response thereto; and
a laser responsive to the energizing pulses for recording on the optical medium.

13. The apparatus of claim 12 wherein the first binary value corresponds to a 1 bit, and the second binary value corresponds to a 0 bit.

14. The apparatus of claim 12 wherein the first set of encoded bit patterns comprises 000111.

15. The apparatus of claim 12 further comprising a second data monitor receiving as input the encoded bits and detecting an occurrence of a second set of encoded bit pattern.

16. The apparatus of claim 15 further comprising a write compensation circuit capable of shifting selected energizing pulses earlier in time in response to an output of the second data monitor.

17. The apparatus of claim 16 wherein the encoded bit pattern in the second set includes a pattern of two consecutive encoded bits having the second binary value.

18. The apparatus of claim 16 wherein the first binary value corresponds to a 1 and the second binary value corresponds to a 0, and the second set of encoded bit pattern includes one of 1100, 10100, and 00100.

19. The apparatus of claim 16 wherein the selected energizing pulses are shifted in a time interval earlier in time.

20. The apparatus of claim 19 wherein the time interval is approximately 4 to 6 or approximately 8 to 12 nanoseconds.

21. The apparatus of claim 16 wherein the selected energizing pulses are shifted earlier in time by delaying all non-selected energizing pulses.

22. The apparatus of claim 15 wherein the first binary value corresponds to a 1 bit, and the second binary value corresponds to a 0 bit, and wherein the first set of encoded bit pattern comprises 000111.

23. An optical disk system including the apparatus recited in claim 1 for recording data on the medium.

24. A method, comprising:
 converting binary data words to binary code words in which encoded bits have first and second binary values at a predefined clock interval;
 generating energizing pulses during each clock interval in which an encoded bit has the first binary value;
 monitoring the encoded bits to detect an occurrence of a first set of encoded bit pattern indicative of a low frequency component and extending a duration of at least one of the energizing pulses in response thereto; and
 turning a laser on and off in response to the energizing pulses for recording on a medium.

25. The method of claim 24, wherein generating energizing pulses generates energizing pulses having a uniform duration less than the clock interval.

26. The method of claim 24 further comprising applying a magnetic field to the medium during recording.

27. The method of claim 24 wherein the first binary value corresponds to a 1 bit, and the second binary value corresponds to a 0 bit, and wherein the first set of encoded bit pattern comprises 000111.

28. The method of claim 24, further comprising:
 detecting the occurrence of a second set of encoded bit pattern; and
 shifting selected energizing pulses earlier in time in response to the detection of the second set of encoded bit pattern.

29. The method of claim 28 wherein the second set of encoded bit pattern includes a pattern of two consecutive encoded bits having the second binary value.

30. The method of claim 28 wherein the first binary value corresponds to a 1 and the second binary value corresponds to a 0, and the second set of encoded bit pattern comprises one of 1100, 10100, and 00100.

31. The method of claim 28 wherein the,selected energizing pulses are shifted in a time interval earlier in time.

32. The method of claim 31 wherein the time interval is approximately 4 to 6 or approximately 8 to 12 nanoseconds.

33. The method of claim 28 wherein the selected energizing pulses are shifted earlier in time by delaying all non-selected energizing pulses.

34. The method of claim 28 wherein the first binary value corresponds to a 1 bit, and the second binary value corresponds to a 0 bit, and wherein the first set of encoded bit pattern comprises 000111.

35. A disk made in accordance with the method of claim 24.

36. A apparatus comprising:
 means for converting binary data words to binary code words in which encoded bits have first and second binary values at a predefined clock interval;
 means for generating energizing pulses during each clock interval in which an encoded bit has the first binary value;
 means for monitoring the encoded bits to detect an occurrence of any one of a first set of encoded bit patterns indicative of a low frequency component and extending a duration of at least one of the energizing pulses in response thereto; and
 means for turning a laser on and off in response to the energizing pulses for recording on a medium.

37. The apparatus of claim 36, further comprising means for applying a magnetic field to the medium during recording.

38. The apparatus of claim 36 wherein the first binary value corresponds to a 1 bit, and the second binary value corresponds to a 0 bit, and wherein the first set of encoded bit pattern comprises 000111.

39. The apparatus of claim 36 further comprising:
 means for detecting an occurrence of a second set of encoded bit pattern; and
 means for shifting selected energizing pulses earlier in time in response to the detection of the second set of encoded bit pattern.

40. The apparatus of claim 39 wherein the second set of encoded bit pattern includes a pattern of two consecutive encoded bits having the second binary value.

41. The apparatus of claim 39 wherein the first binary value corresponds to a 1 and the second binary value corresponds to a 0, and the second set of encoded bit pattern comprises one of 1100, 10100, and 00100.

42. The apparatus of claim 39 wherein the selected energizing pulses are shifted in a time interval earlier in time.

43. The apparatus of claim 42 wherein the time interval is approximately 4 to 6 or approximately 8 to 12 nanoseconds.

44. The apparatus of claim 39 wherein the selected energizing pulses are shifted earlier in time by delaying all non-selected energizing pulses.

45. The apparatus of claim 39 wherein the first binary value corresponds to a 1 bit, and the second binary value corresponds to a 0 bit, and wherein the first set of encoded bit pattern comprises 000111.

46. An optical disk system including the apparatus recited in claim 36 for recording data on the medium.

47. An apparatus comprising:
 encoder means for converting binary data words to binary code words in which encoded bits have first and second binary values at a predefined clock interval;
 pulse generator means responsive to the encoded bits so that energizing pulses having a uniform duration less than the clock interval are generated during each clock interval in which the encoded bits have the first binary value; and
 a laser responsive to the energizing pulses for recording on the optical medium.

48. The apparatus of claim 47, further comprising magnetic flux means for applying a magnetic flux to the optical medium during recording.

49. The apparatus of claim 47, further comprising:
 data monitor means for receiving as input the encoded bits and detecting an occurrence of a set of encoded bit pattern; and write compensation circuit means capable of shifting selected energizing pulses earlier in time in response to the detection of the encoded bit pattern.

50. The apparatus of claim 49 wherein the encoded bit pattern in the set includes a pattern of two consecutive encoded bits having the second binary value.

51. The apparatus of claim 50 wherein the first binary value corresponds to a 1 and the second binary value corresponds to a 0, and the set of encoded bit pattern comprises one of 1100, 10100, and 00100.

52. The apparatus of claim 49 wherein the selected energizing pulses are shifted in a time interval earlier in time.

53. The apparatus of claim 52 wherein the time interval is approximately 4 to 6 or approximately 8 to 12 nanoseconds.

54. The apparatus of claim 49 wherein the selected energizing pulses are shifted earlier in time by delaying all non-selected energizing pulses.

55. The apparatus of claim 47, further comprising;

data monitor means for receiving as an input the encoded bits and detecting an occurrence of an encoded bit pattern indicative of a low frequency component and capable of extending at least one of the energizing pulses in response thereto.

56. The apparatus of claim 55 wherein the first binary value corresponds to a 1 bit, and the second binary value corresponds to a 0 bit, and wherein the encoded bit pattern comprises 00011.

57. A method comprising the steps of:

directing a read beam at a recorded surface of the disk such that the read beam selectively accesses one of a plurality of tracks on the recorded surface;

detecting from a modulated beam returning from the recorded surface, the data recorded on the disk;

generating from the data recorded on the disk a clock signal that defines a clock interval equal to a time duration between bits of data recorded on the disk during a window substantially equal to the clock interval; and pulse shaping by narrowing the width and increasing the amplitude of pulses of the binary signal by differentiating the binary signal, equalizing the differentiated signal, generating a first derivative of the equalized signal, and summing the equalized signal with the first derivative, thereby generating an improved binary signal; and adjusting the threshold of sensitivity applied in the detecting step in response to the results of the pulse shaping.

* * * * *